(12) United States Patent
Lowe et al.

(10) Patent No.: US 11,681,277 B1
(45) Date of Patent: Jun. 20, 2023

(54) PINE STRAW PROCESSING AND BAGGING SYSTEM

(71) Applicant: Swift Straw II, LLC, Atlanta, GA (US)

(72) Inventors: Matthew William Lowe, Atlanta, GA (US); Wade Haralson Goetz, Jr., Atlanta, GA (US)

(73) Assignee: SWIFT STRAW II, LLC, Atlanta, GA (US)

( * ) Notice: Subject to any disclaimer, the term of this patent is extended or adjusted under 35 U.S.C. 154(b) by 0 days.

(21) Appl. No.: 17/232,363

(22) Filed: Apr. 16, 2021

Related U.S. Application Data

(63) Continuation of application No. 16/361,900, filed on Mar. 22, 2019, now Pat. No. 11,029,669.

(60) Provisional application No. 62/647,785, filed on Mar. 25, 2018.

(51) Int. Cl.
| | |
|---|---|
| *B65D 85/07* | (2017.01) |
| *G05B 19/418* | (2006.01) |
| *B65D 65/10* | (2006.01) |
| *B27M 1/02* | (2006.01) |
| B65B 27/00 | (2006.01) |
| B65D 85/46 | (2006.01) |
| B65B 25/00 | (2006.01) |
| B65D 65/46 | (2006.01) |

(52) U.S. Cl.
CPC ......... *G05B 19/41815* (2013.01); *B27M 1/02* (2013.01); *B65D 65/10* (2013.01); *B65D 85/07* (2018.01); *G05B 19/4187* (2013.01); B65B 25/00 (2013.01); B65B 27/00 (2013.01); B65D 65/466 (2013.01); B65D 85/46 (2013.01)

(58) Field of Classification Search
CPC ........ B65D 85/00; B65D 85/07; B65D 65/10; B65B 5/045; B65B 13/00; B65B 13/18; B65B 13/20; B65B 25/00; B65B 25/02; B65B 25/023; B65B 27/10; B65B 27/12; B65B 27/125; B30B 9/30; A01F 15/00
USPC .......................................................... 53/438
See application file for complete search history.

(56) References Cited

U.S. PATENT DOCUMENTS

| | | | | |
|---|---|---|---|---|
| 3,762,311 | A * | 10/1973 | Friedman | .............. B30B 9/3078 100/45 |
| 6,152,026 | A * | 11/2000 | Simpson | ............... A01F 15/005 100/189 |
| 11,029,669 | B1 * | 6/2021 | Lowe | ....................... B27M 1/02 |
| 2016/0243779 | A1 * | 8/2016 | Woosley | .............. B30B 9/3078 |
| 2017/0001400 | A1 * | 1/2017 | Gaudreault | ......... B02C 18/2241 |
| 2017/0196193 | A1 * | 7/2017 | Cross | ................... A01K 1/0155 |

* cited by examiner

*Primary Examiner* — Chelsea E Stinson
(74) *Attorney, Agent, or Firm* — C. Brandon Browning; Ilya S. Mirov; Maynard Nexsen PC

(57) ABSTRACT

A system and method for packaging pine straw and a packaged mass of pine straw made therefrom, the method including providing an electronically-controlled system configured for packaging pine straw, the system including system logic that controls conveying, fluffing, cleaning, compressing and packaging of the pine straw, and using the system to compress a mass of pine straw into a rectangular mass of pine straw and enclosing the rectangular mass of pine straw within a flexible plastic sheet thereby forming a substantially rectangular packaged mass of compressed pine straw.

19 Claims, 32 Drawing Sheets

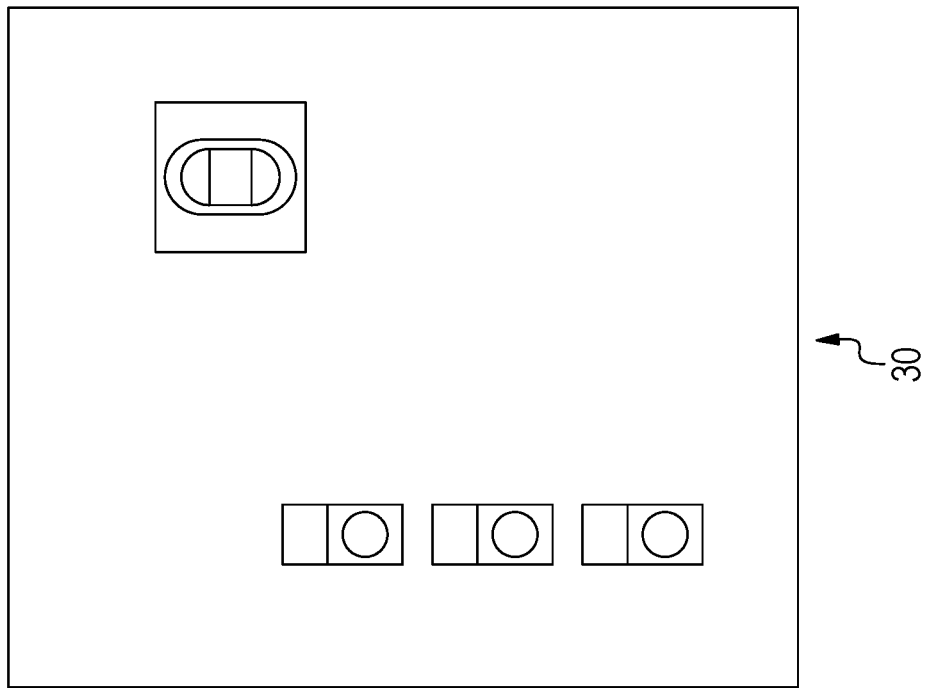
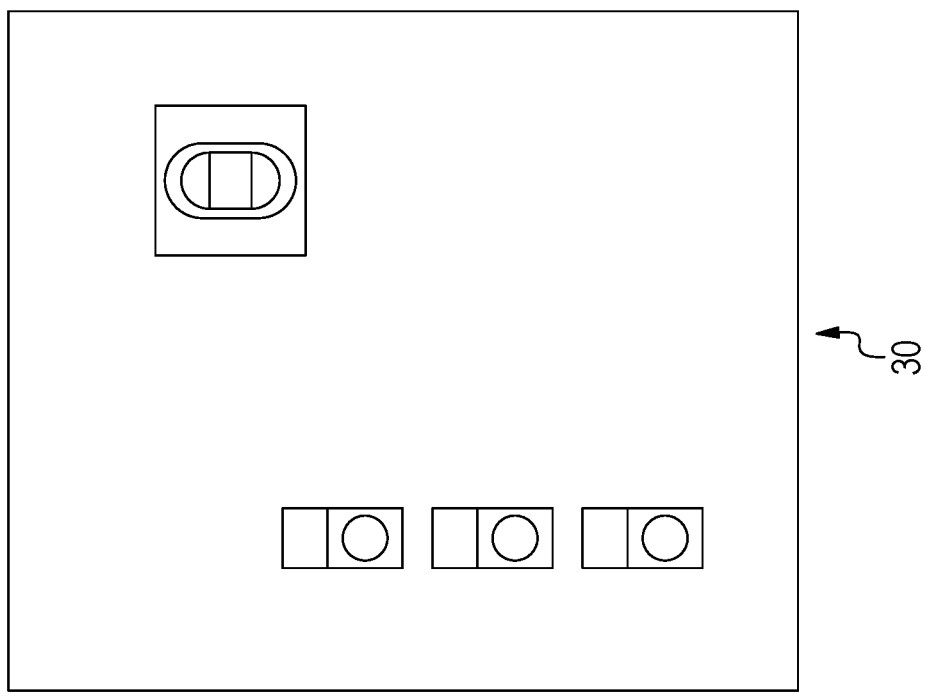
FIG. 9A

PINE STRAW PROCESSING AND BAGGING SYSTEM

RELATED APPLICATIONS

This application is a continuation of and claims priority to U.S. Non-provisional patent application Ser. No. 16/361,900, filed on Mar. 22, 2019, and titled "Pine Straw Processing and Bagging System," which claims priority to U.S. Provisional Patent Application No. 62/647,785, filed on Mar. 25, 2018, and titled "Pine Straw Processing and Bagging System," the entire contents of which are incorporated herein by reference.

BACKGROUND

Materials used for landscaping are harvested and combined for storage in bulk. Desired landscaping materials such as hay and pine straw may be harvested from natural environments using harvesting equipment, such as by cutting or gathering the material from a field. In the context of pine straw, equipment may be used to form large bales or rolls to make the pine straw easier to manage or transport. These large rolls may be separated into smaller portions of pine straw and sold to purchasers.

As part of the harvesting process, unwanted materials are often harvested along with to the desired material and included with the pine straw in the bale. Removing debris harvested along with the pine straw may be impractical because the foreign debris may be difficult to separate from the pine straw. For example, some debris may adhere to the pine straw, or may be too small to detect or too unwieldy for efficient removal. Dust and other particles also may be included. Thus, such unwanted objects may remain with the pine straw after harvesting. If the pine straw is later sold to a purchaser, unless the foreign debris is removed, it may be provided to a purchaser along with the desired pine straw. This may lead to frustration for the purchaser and decreased perception of value provided by the seller. Improved techniques for processing pine straw are generally desired.

SUMMARY OF THE INVENTION

The present invention is directed to system for packaging pine straw and a packaged mass of pine straw made therefrom. According to a first aspect of the invention, there is provided a method of packaging pine straw including providing an electronically-controlled system configured for packaging pine straw, the system including system logic that controls conveying, fluffing, cleaning, compressing and packaging of the pine straw, and using the system to compress a mass of pine straw into a rectangular mass of pine straw and enclose the rectangular mass of pine straw within a flexible plastic sheet thereby forming a substantially rectangular packaged mass of compressed pine straw. According to one embodiment, the packaged mass of compressed pine straw is about 24 inches long, about 18 inches wide and about 16 inches high. In another embodiment, the packaged mass of compressed pine straw weighs from 18 pounds to 25 pounds. In another embodiment, the mass of pine straw is compressed into the rectangular mass of pine straw using between 1750 psi to 2000 psi of pressure. In another embodiment, the mass of pine straw is compressed into the rectangular mass of pine straw using two horizontal compression rams and one vertical compression ram. In another embodiment, the mass of pine straw is compressed into the rectangular mass of pine straw and enclosed within the plastic sheet using a bagger that is controlled by the system logic. In another embodiment, the pine straw is conveyed on a belt conveyor system to the bagger, wherein the belt conveyor system fluffs the pine straw. In another embodiment, pine straw dust is removed from the bagger using an aspiration system. In another embodiment, the bagger weighs a mass of pine straw in a weighing chamber, compresses the mass of pine straw in a compression chamber and encloses the rectangular mass of pine straw within the flexible plastic sheet in a bagging area. In yet another embodiment, the aspiration system is used to remove dust from the weighing chamber, the compression chamber and the bagging area.

According to a second aspect of the invention, there is provided a pine straw packaging system including a system logic configured for controlling conveying, fluffing, cleaning, compressing and packaging of pine straw, a conveyor operatively coupled to the system logic, the conveyor having means for fluffing and cleaning the pine straw, and a bagger operatively coupled to the system logic, the bagger having means for weighing, compressing and packaging the pine straw. According to one embodiment of the invention, the system includes an aspiration system operatively coupled to the system logic and the bagger, the aspiration system including one or more conduits operatively coupled to and between the bagger and a suction device. According to another embodiment, the one or more conduits are operatively coupled to and between the means for weighing, compressing and packaging the pine straw and the suction device. According to another embodiment, the means for weighing, compressing and packaging the pine straw includes a pine straw weighing chamber, a compression chamber and packaging area. According to yet another embodiment, the one or more conduits include a first conduit arranged to remove pine straw dust from the weighing chamber, a second conduit arranged to remove pine straw dust from the compression chamber and a third conduit arranged to remove duct from the packaging area.

According to a third aspect of the invention, there is provided a pine straw mass including a compressed mass of pine straw weighing from 18 pounds to about 25 pounds and having a length of about 24 inches, a width of about 18 inches and a height of about 16 inches, and a flexible plastic sheet enclosing the compressed mass of pine straw. According to one embodiment, the sheet is transparent. According to another embodiment, the flexible plastic sheet forms a substantially rectangular enclosure about the compressed mass of pine straw. According to yet another embodiment, the enclosure includes a first end, a second end, a continuous sidewall extending to and between the first end and the second end, the side wall including a seam which extends to and between the first end and the second end.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 9A shows a controller of a pine straw processing system in accordance with some embodiments of the present disclosure;

DETAILED DESCRIPTION

Figure 1:
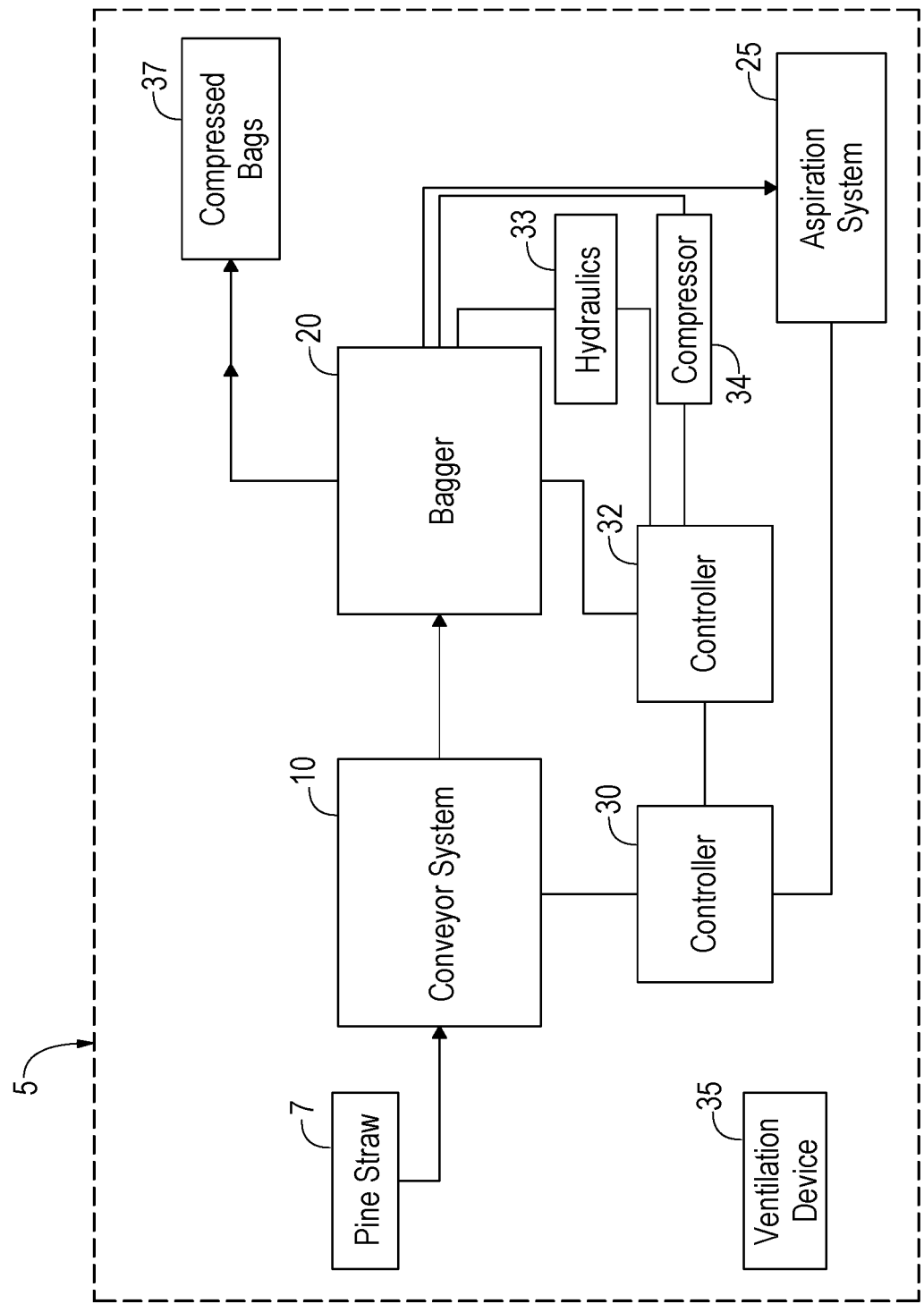
FIG. 1 is a block diagram showing a pine straw processing system in accordance with some embodiments of the present disclosure.

The present disclosure generally pertains to systems and methods for processing and bagging pine straw. Pine straw is loaded onto a loading deck of a conveyor system of a pine straw processing and bagging system. When a bagger of the system needs more pine straw for bagging, a conveyor of the loading deck advances a layer of the pine straw and provides it to a first unroller. A cleated conveyor of the first unroller conveys the layer of pine straw toward a first fluffer of the first unroller positioned above the cleated conveyor. The first fluffer engages and fluffs an upper first portion of the layer, leaving a lower second portion unfluffed. The first cleated conveyor conveys the second portion of the layer together with any pine straw from the fluffed first portion to a second cleated conveyor of a second unroller. As with the first unroller, a cleated conveyor of the second unroller conveys the pine straw layer toward a second fluffer of the second unroller positioned above the second cleated conveyor. The second fluffer engages and fluffs an upper third portion of the layer, leaving a lower fourth portion unfluffed. The second cleated conveyor conveys the fourth portion of the layer together with any pine straw from the fluffed third portion to a hopper area where it may be inspected and provided to an incline conveyor. The incline conveyor conveys the pine straw toward a top portion of the bagger and feeds the pine straw into the top of the bagger.

The bagger weighs the pine straw as it accumulates in a pre-weigh area of the bagger. When the weight of the pine straw approaches a desired bagging weight, the conveyor may reduce a rate at which it is feeding pine straw into the bagger. Pine straw may be fed into the bagger at the reduced rate until the desired weight of pine straw is accumulated within the pre-weigh area of the bagger. Operation of the conveyor system may be coordinated with operation of the bagger such that the conveyor system stops feeding pine straw to the bagger if the bagger is not ready for more pine straw (e.g., if there is a malfunction or problem at the bagger).

When the desired weight of pine straw has been accumulated, the pine straw may be provided to a compression chamber, where a plurality of compressions (e.g., vertical, horizontal, etc.) may be performed to compress the pine straw. The compressed pine straw may then be provided for packaging and sealing at a bagging area of the bagger. The bagging area may provide compressed bags of pine straw for transportation.

An aspiration system may be coupled to the bagger to remove loose debris from the pine straw while it is in the bagger. The aspiration system may include filtering elements such as a cyclone and aspirator for filtering airborne debris and microdust for disposal. Operation of the aspiration system also may be coordinated based on operation of the bagger, such that the aspiration system may stop while the bagger is not operating (e.g., and the conveyor system is not feeding the bagger more pine straw).

FIG. 1 depicts a block diagram of a pine straw processing and bagging system 5 according to some embodiments of the present disclosure. Unprocessed pine straw 7 may be provided to conveyor system 10 for processing. The conveyor system 10 may "fluff" (e.g., engage with a toothed fluffer to toss and loosen) the pine straw 7 in order make debris easy to identify and remove before it is provided to bagger 20 for compression and bagging. The system 5 also includes an aspiration system 25 that is configured to remove additional debris and microdust from unprocessed pine straw 7 as it passes through the bagger 20. In this regard, the system 5 is configured to allow for gradual removal of debris from pine straw 7 as it passes through the system 5 until it is eventually bagged. In other embodiments, the system 5 may include other devices and equipment configured to further process the pine straw 7 before compression and bagging. Note that, although pine straw 7 is the particular material in the exemplary embodiments described herein, in other embodiments, the system 5 may be configured for processing, compressing and bagging other materials, such as wheat straw, erosion hay, or otherwise.

The system 5 includes a first controller 30 and second controller 32. In some embodiments, the first controller 30 maybe coupled to control operations of the conveyor system 10 and aspiration system 25, such as starting, stopping, or controlling the speed of any or various combinations of components of the conveyor system 10 and aspiration system 25. Controller 32 may be coupled to control bagger 20, hydraulics system 33 and compressor 34, such as weighing, compression and bagging of pine straw provided by the conveyor system 10. In addition, the controller 30 maybe coupled to controller 32 such that operations of the conveyor system 10 and aspiration system 25 may be synchronized with operations of the bagger 20. For example, the conveyor system 10 and aspiration system 25 may be configured to stop operation when the bagger 20 stops operating. In this regard, operations of components of the system 5 controlled by each of the controllers 30 and 32 may be coordinated, synchronized or otherwise associated.

Hydraulic system 33 is coupled to provide hydraulic power (pressure) to hydraulically-powered resources of the bagger 20, and may include various components for generating and providing hydraulic power. Compressor 34 is coupled to provide pneumatic power (pressure) to pneumatically-powered resources of the bagger 20, and may include various components for generating and providing pneumatic power. Controller 32 is configured to control operations of hydraulic system 33 and compressor 34 in coordination with operation of the bagger 20.

The aspiration system 25 is coupled to bagger 20, and is configured to remove unwanted debris from pine straw as it moves through bagger 20 before compression and bagging. In some embodiments, the aspiration system 25 may be configured to remove the unwanted debris using suction (e.g., negative pressure), but the aspiration system 25 may perform debris removal by other techniques in other embodiments. The aspiration system 25 may be configured to remove various types of debris, but in some embodiments, the aspiration system 25 is configured to remove non-pine straw debris and microdust, which can include various types of objects such as pinecones, branches, rocks, partial pieces of pine straw, or other non-pine straw other objects that may be unsuitable for use with the pine straw. As described in further detail below, the aspiration system 25 may include various components for removing unwanted debris from the pine straw.

Figure 18:
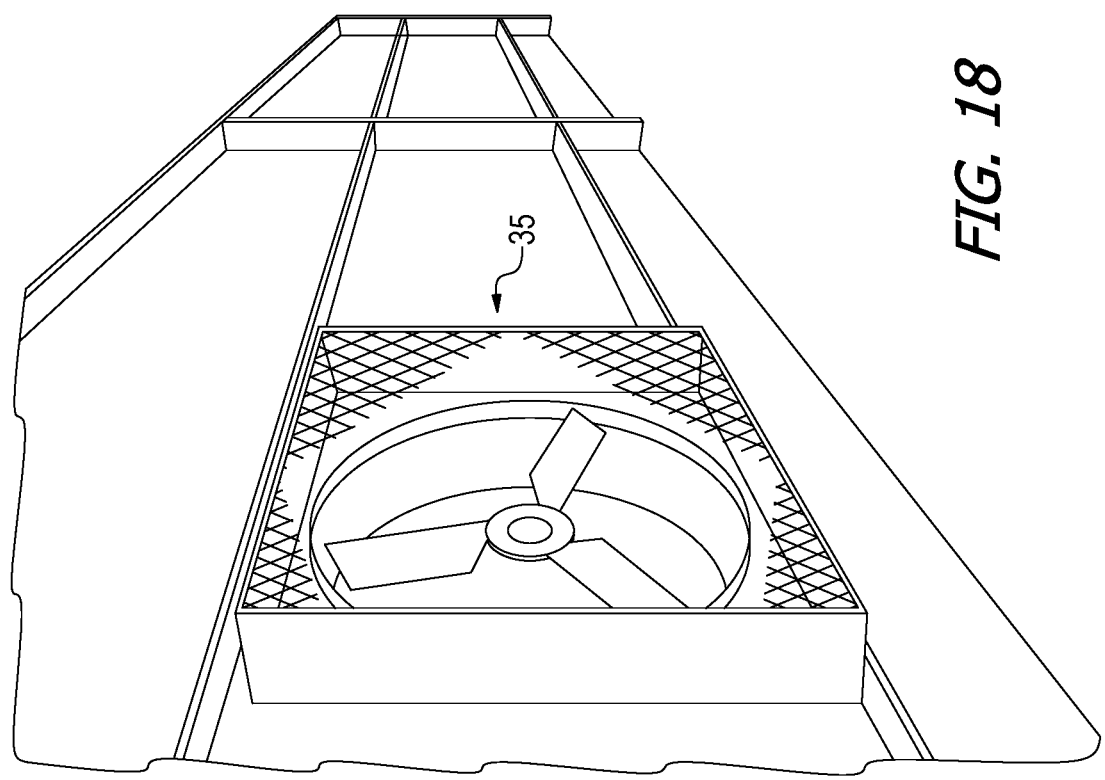
FIG. 18 shows a ventilation device of a pine straw processing system in accordance with some embodiments of the present disclosure.

Embodiment of system 5 depicted by FIG. 1 also includes a ventilation device 35, also depicted by FIG. 18. Microdust, particles, and other debris may become airborne during processing of pine straw 7. The ventilation device 35 may be configured to blow contaminated air containing from inside the facility into the environment. It also may be configured to exchange such contaminated air for uncontaminated air. The ventilation device 35 may be various types of devices for performing ventilation within the facility where system 5 is operating and in one embodiment, may be implemented as a fan (e.g., chicken fan) or other device. The ventilation device 35 may be controlled by one or more of controllers 30, 32 in some embodiments, and may be positioned in various positions to achieve the functionality described herein. In this regard the ventilation device 35 may be configured to maintain a cleaner environment for operation of system 5.

Figure 2:
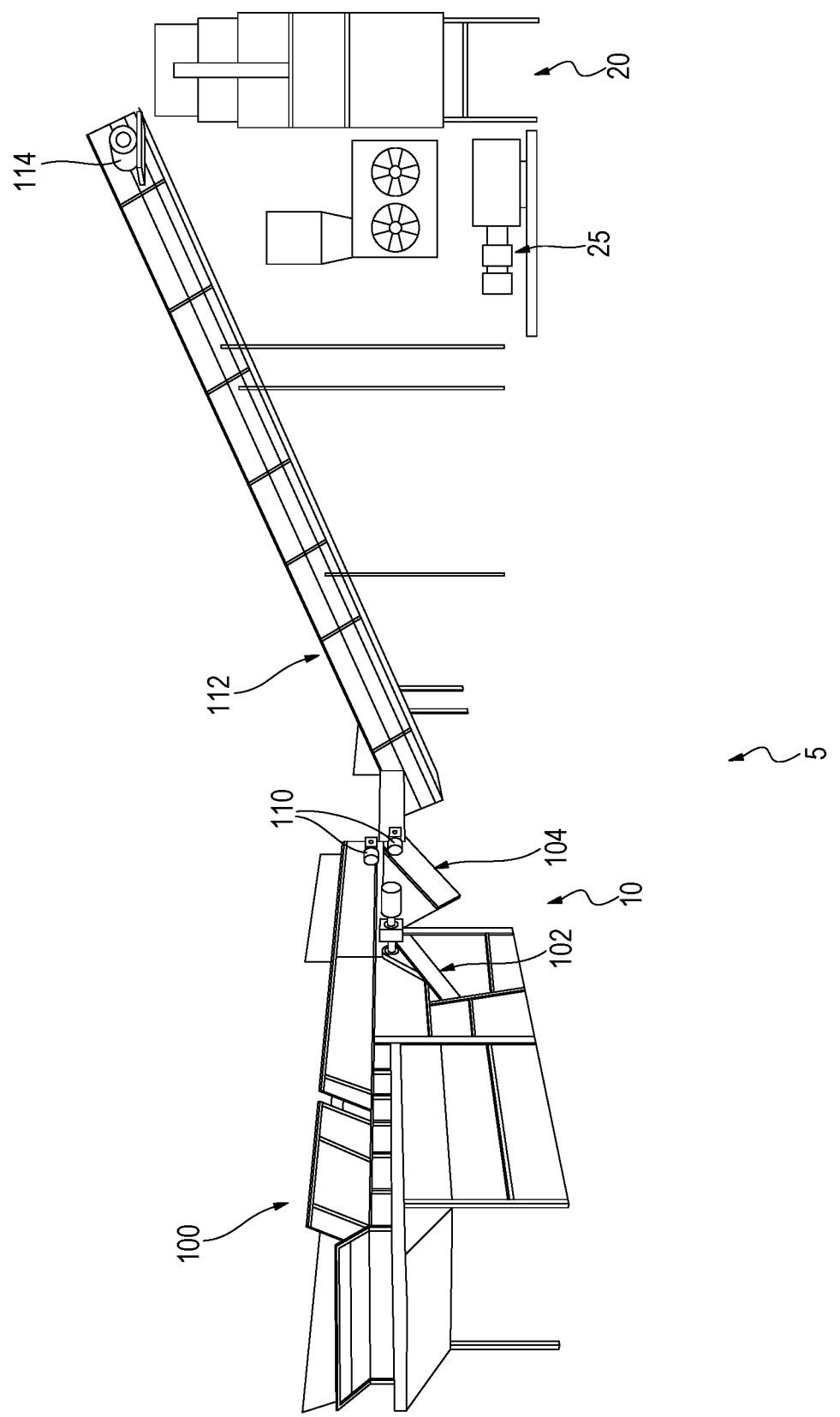
FIG. 2 shows a view of pine straw processing system in accordance with some embodiments of the present disclosure.
Figure 3:
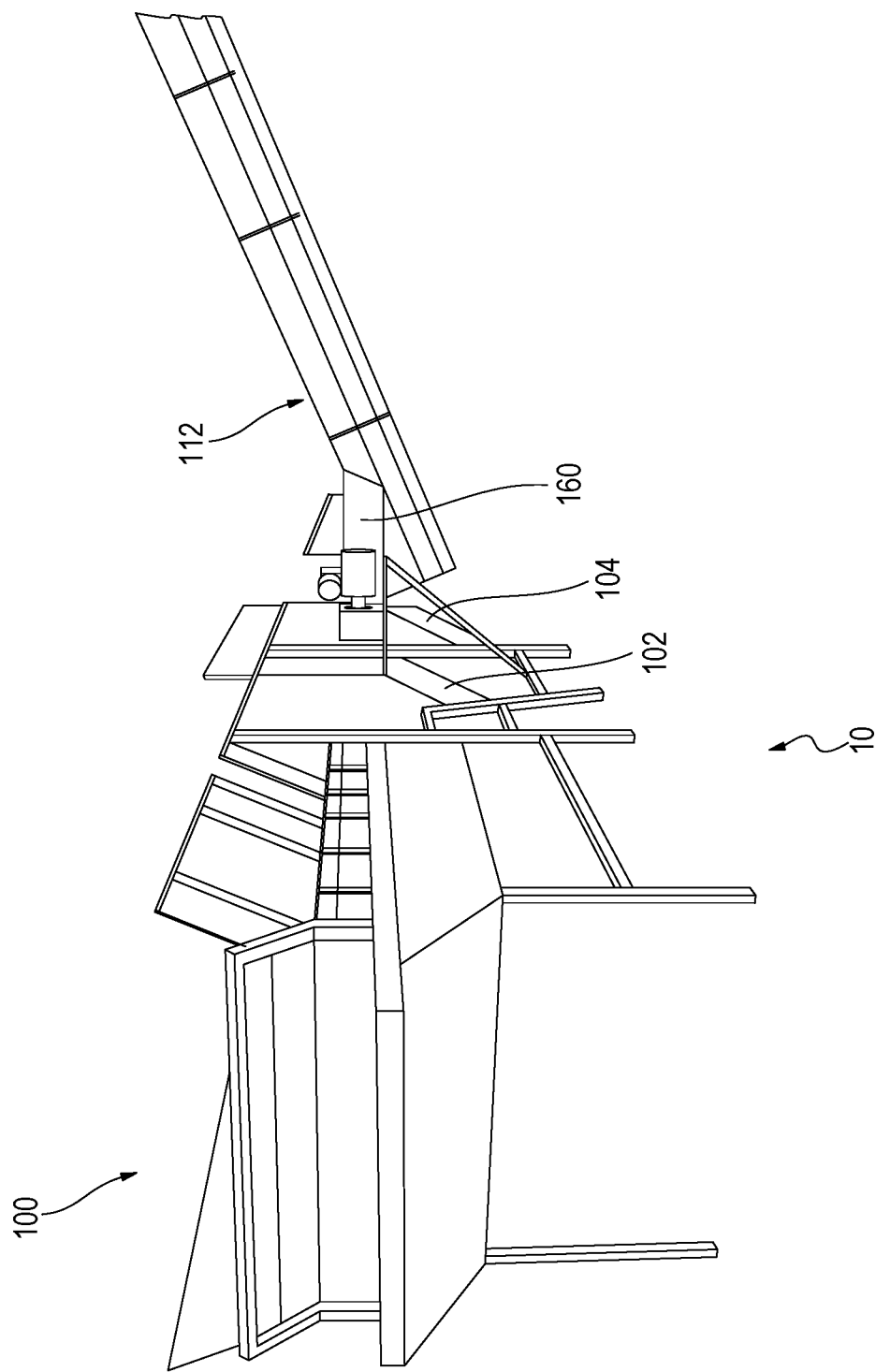
FIG. 3 shows a side-perspective view of a conveyor system of a pine straw processing system in accordance with some embodiments of the present disclosure.

Turning to FIGS. 2-3, the unprocessed pine straw may initially be removed from a large bale (e.g., approximately 450-1100 lbs.) and may be separated or "fluffed" using other equipment or implementations not depicted by FIGS. 2-3 (e.g. a "horseshoe" device, bale spear, mechanical tractor attachments, hand tools, etc.). Note that, in some embodiments, a moisture level of the unprocessed pine straw may be ascertained (e.g., using a moisture probe) before processing in order to adjust operation of the system 5 based on the moisture content (e.g., adjust motor speeds, etc.). Pine straw then maybe provided to a loading deck 100 of the conveyor system 10, as depicted in FIG. 2 (e.g., using a tractor with bucket) where it can begin the process of moving through conveyor system 10.

The loading deck 100 of FIG. 2 may be configured to receive pine straw after it has been separated from a bale and convey the pine straw to unrollers 102 and 104 for "fluffing" using a conveyor (not specifically shown in FIGS. 2-3). As described further below, each unroller 102 and 104 has at least one fluffer and cleated conveyor. The conveyor system 10 of FIG. 2 includes a plurality of motors 110 that are configured to power each of the fluffers and cleated conveyors of unrollers 102 and 104. The motors 110 can be various types of motors for powering components of unrollers 102 and 104, but in some embodiments, the motors 110 are three-phase 460 electric motors, and can vary in power and output ratings. In some embodiments, power ratings for the motors 110 range between approximately 3-10 horsepower (hp), but other power ratings are possible. The motors 110 may have various gear ratios, and may be configured to operate at adjustable speeds and power outputs, such as based on control by controller 30.

The conveyor system 10 also includes an incline conveyor 112. The incline conveyor 112 may have a conveyor belt (FIG. 7) and may be configured to convey pine straw from a hopper (FIG. 6) to a top portion of the bagger 20 where it can be fed into the bagger 20. As described further below, the incline conveyor 112 may be belt-driven, and maybe powered by incline conveyor motor 114 (FIG. 2). Motor 114 can be various types of motors for powering the incline conveyor 112, but in some embodiments, the motor 114 is a three-phase 460 electric motor which can have a power rating of approximately between 3-10 hp or other power rating.

Figure 4:
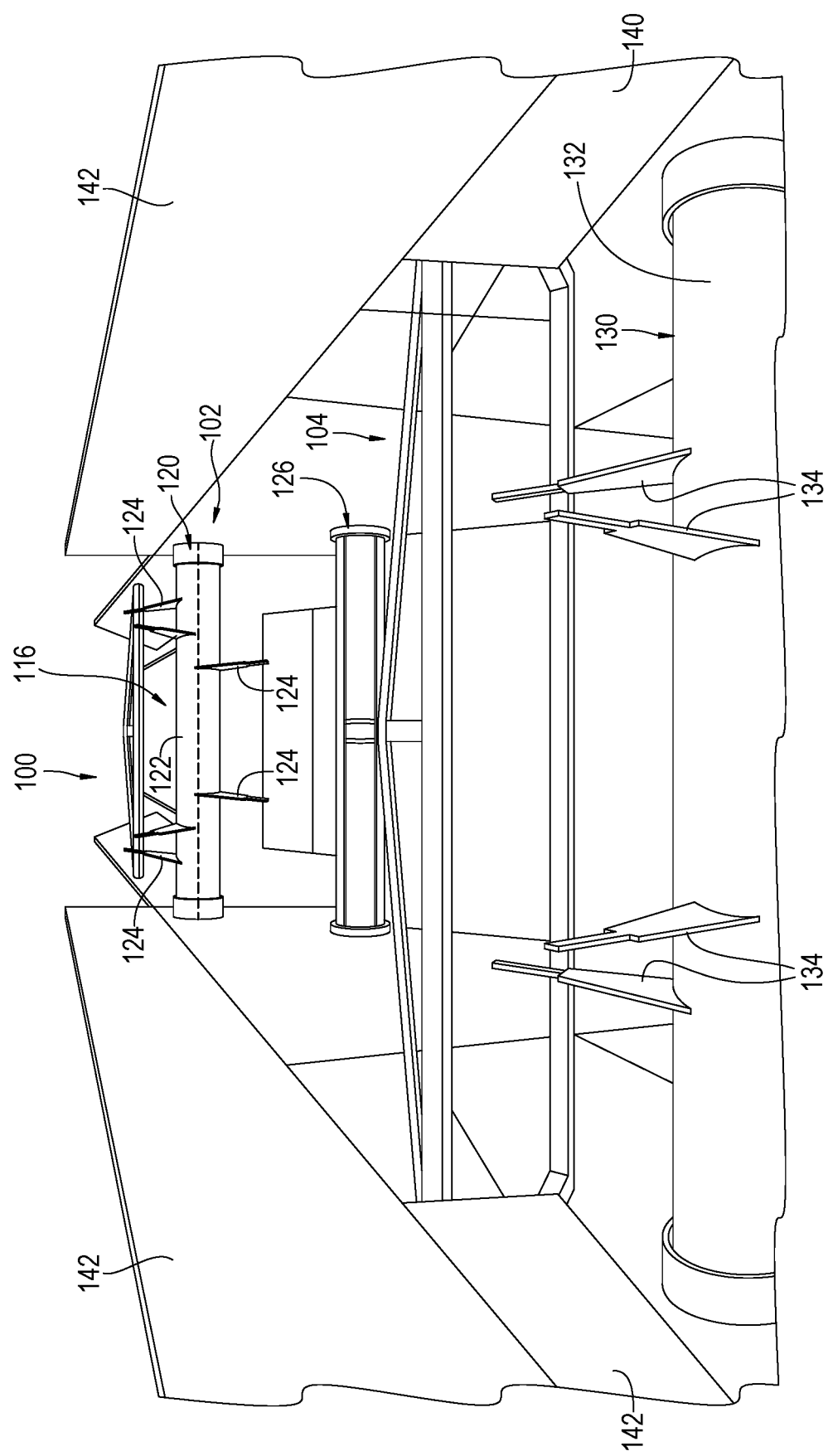
FIG. 4 shows an alternative view of a conveyor system of a pine straw processing system in accordance with some embodiments of the present disclosure.

With regard to FIG. 4, the loading deck 100 may include a conveyor 116 for providing pine straw to the first unroller 102 (not specifically shown in FIG. 2). The conveyor 116 can have a belt, mesh, or other suitable components for feeding pine straw to the first unroller 102 for fluffing. In some embodiments, the conveyor 116 of loading dock 100 may be powered by an electrical motor (not specifically shown in FIG. 4), configured in a similar manner to motors 110 and 114.

As noted above, conveyor system 10 has two unrollers 102, 104 for fluffing a pine straw layer as it passes through the conveyor system 10 to gradually reduce a thickness of the pine straw layer and enable identification and removal of foreign objects and debris (e.g., by a user performing quality assurance duties). Other numbers of unrollers are possible in other embodiments. Additional exemplary information regarding the operation of unrollers and fluffers may be found in U.S. Pat. No. 6,152,026 entitled "System for bailing farm products" and filed on Jun. 7, 1999, which is hereby incorporated by reference into this disclosure in its entirety, as well as U.S. Pat. No. 6,966,512 entitled "System for un-bailing farm products" and filed on Apr. 11, 2003, which is hereby incorporated by reference into this disclosure in its entirety.

The conveyor system 10 also has two vertically-oriented side walls 140, 142 extending substantially the length of a portion of the conveyor system 10 adjacent to unrollers 102, 104. In this regard, the side walls 140, 142 may be configured for retaining pine straw during the fluffing process. The side walls 140, 142 may extend various desired heights to ensure pine straw is retained during the fluffing process, but in some embodiments, the side walls 140, 142 extend approximately 3-4 feet.

First unroller 102 may be configured receive a layer of pine straw (e.g., approximately 18-24 inches or other thickness) from the conveyor 116 of loading deck 100, convey the layer of pine straw using a cleated conveyor 126. The layer may be fed by the cleated conveyor 126 to contact a fluffer 120 rotating above the cleated conveyor 126. The fluffer 120 fluffs an upper first portion of the pine straw layer (e.g., fluffs or removes the upper approximately 8-14-inch layer or other thickness), but does not fluff a lower second portion (e.g., a lower approximately 10-inch layer). This may be referred to as a "first cut" in the context of this document. Fluffing by the fluffer 120 may separate or thrash the pine straw of the layer, thereby dislodging or discharging debris (e.g., pine cones, limbs, other objects, etc.) and throwing the fluffed portion of the pine straw layer into the air while leaving the lower portion, thus reducing thickness of the pine straw layer. The fluffed pine straw may land on conveyor 126 and be fed into the fluffer 120 again, where the straw may be fluffed again if in an upper layer engaged by the fluffer 120 or not if in a lower second portion of the layer. Alternatively, the fluffed pine straw may land on the lower second portion of the layer after it has passed from the conveyor 126 and into the second conveyor 136 (e.g., unroller 104). In this regard, the pine straw may be loosened each time it is fluffed, and a thickness of a layer of pine straw passing through the unroller 102 may be reduced before it is fed to the second unroller 104 for additional fluffing.

Fluffer 120 has a center axle 122 with a center or longitudinal axis about which the fluffer 120 is configured to rotate. The rotation may be in a desired manner (e.g., clockwise or counterclockwise) and at a desired speed, such as based on the rotation and speed of a motor (e.g., motor 110 of FIG. 2) driving the fluffer 120. The fluffer 120 may have a plurality of teeth 124 positioned on axle 122 that are configured engage the upper portion of the pine straw layer passing between the fluffer 120 and cleated conveyor 126 and throw or toss the pine straw as the fluffer 120 rotates. The plurality of teeth 124 may include teeth of various sizes, shapes and may be positioned as desired to achieve desired functionality. Note that positions of the components of unroller 102 may be adjusted, such that conveyor 126 and fluffer 120 may be positioned relative to one another as desired (e.g., at a closer distance to fluff a deeper cut of the pine straw layer and thereby further reduce a thickness of the pine straw layer).

The cleated conveyor 126 may include a cleated surface configured to rotate or move to feed the pine straw layer to the fluffer 120. The conveyor 126 may be positioned at an incline such that it directs the unfluffed pine straw layer toward the fluffer 120. As noted above, the conveyor can operate at various speeds based on a speed of a motor driving the conveyor 126. The cleated conveyor 126 may be configured to provide the lower portion of the pine straw layer to second unroller 104 for further processing.

Second unroller 104 may be configured to operate similarly to unroller 102. Unroller 104 may be configured receive the layer of pine straw from the first unroller 102 (e.g., approximately 10-inch layer or other thickness) via cleated conveyor 126, convey the layer of pine straw using a cleated conveyor 136. The layer may be fed by the cleated conveyor 136 to contact a fluffer 130 rotating above the cleated conveyor 136. The fluffer 130 fluffs an upper third portion of the pine straw layer (e.g., fluffs or removes the upper approximately 7.5-inch layer or other thickness), but does not fluff a lower fourth portion (e.g., a lower approximately 2.5-inch layer). This may be referred to as a "second cut" in the context of this document. Fluffing by the fluffer 130 may separate or thrash the pine straw of the layer, thereby dislodging or discharging debris (e.g., pine cones, limbs, other objects, etc.) and throwing the fluffed third portion of the pine straw layer into the air while leaving the lower fourth portion, thus further reducing thickness of the pine straw layer. The fluffed pine straw may land on conveyor 136 (FIG. 6) and be fed into the fluffer 130 again, where the straw may be fluffed again if in an upper third layer engaged by the fluffer 130 or not if in a lower fourth portion of the layer. Alternatively, the fluffed pine straw may land on the lower portion of the layer after it has passed from the conveyor 136 and into the hopper 160. In this regard, the pine straw may be loosened each time it is fluffed, and a thickness of a layer of pine straw passing through the unroller 104 may be reduced before it is fed to the hopper 160 for inspection and provision to the incline conveyor 112.

Figure 5:
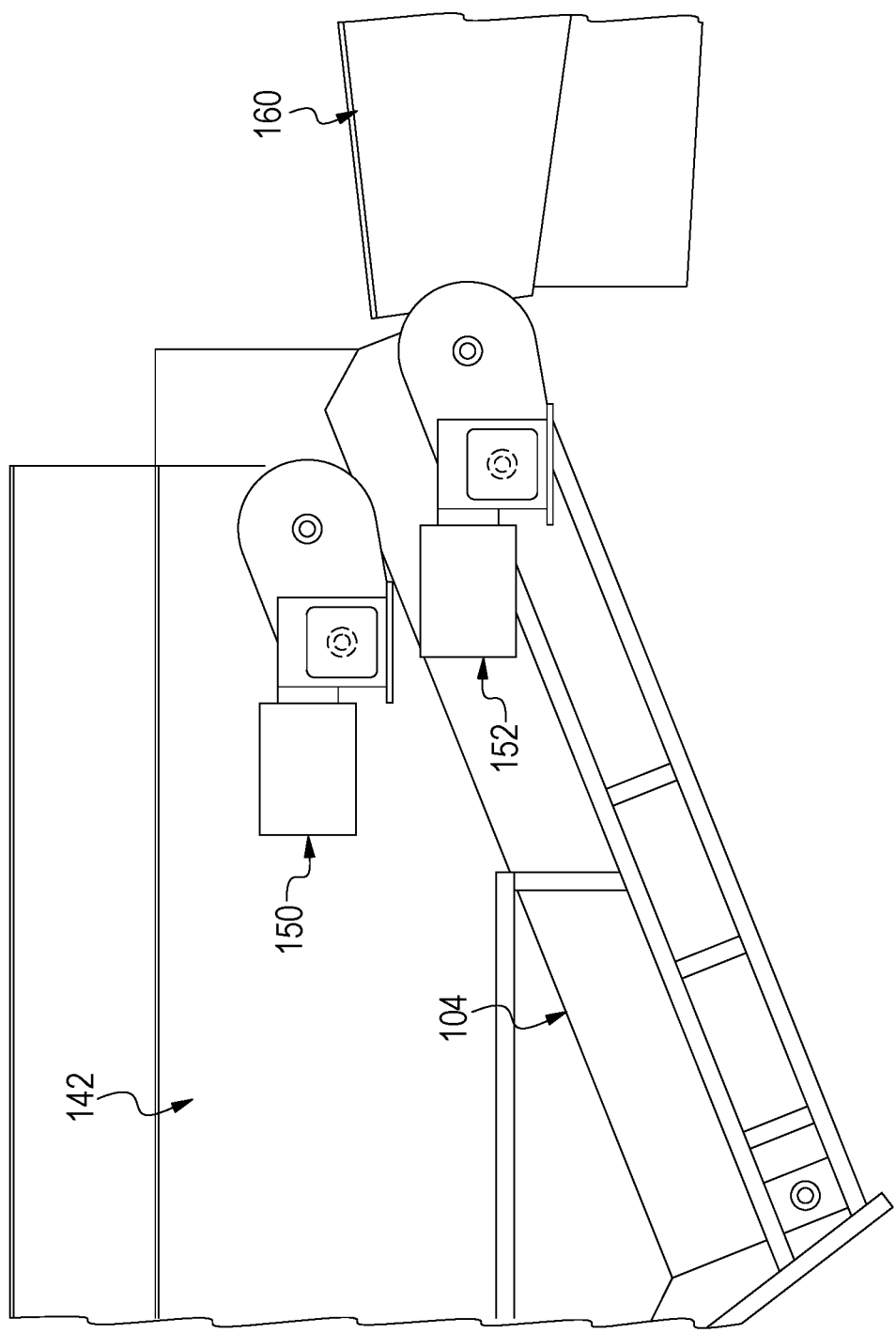
FIG. 5 shows a side-perspective view of conveyor system of a pine straw processing system in accordance with some embodiments of the present disclosure.

Fluffer 130 has a center axle 132 with a center or longitudinal axis about which the fluffer 130 is configured to rotate. The rotation may be in a desired manner (e.g., clockwise or counterclockwise) and at a desired speed, such as based on the rotation and speed of a motor (e.g., motor 150 of FIG. 5) driving the fluffer 130. The fluffer 130 may have a plurality of teeth 134 positioned on axle 132 that are configured engage the upper portion of the pine straw layer passing between the fluffer 130 and cleated conveyor 136 and throw or toss the pine straw as the fluffer 130 rotates. The plurality of teeth 134 may include teeth of various sizes, shapes and may be positioned as desired to achieve desired functionality. Note that positions of the components of unroller 104 may be adjusted, such that conveyor 136 and fluffer 130 may be positioned relative to one another as desired (e.g., at a closer distance to fluff a deeper cut of the pine straw layer and thereby further reduce a thickness of the pine straw layer).

Figure 6:
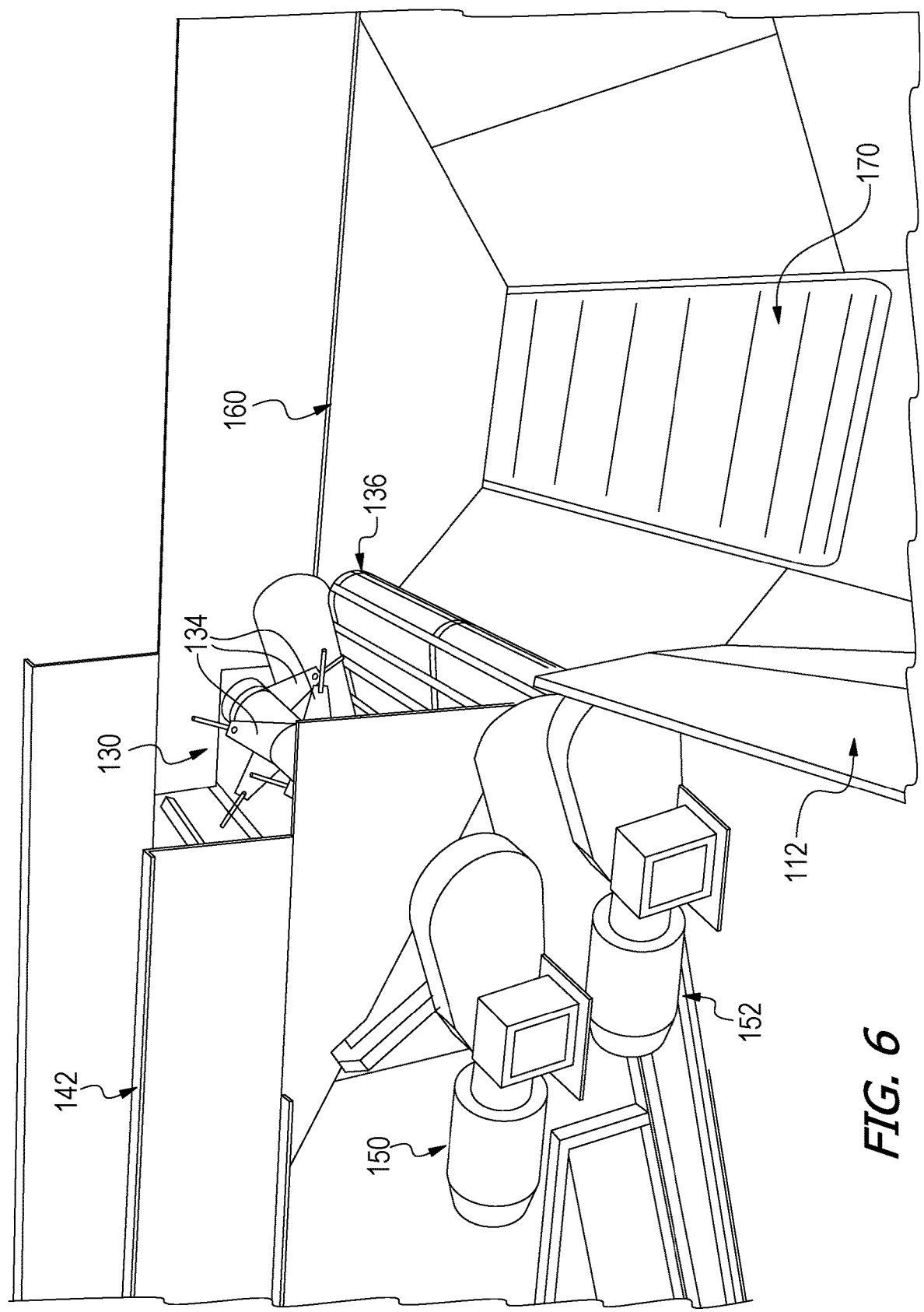
FIG. 6 shows an alternative view of conveyor system of a pine straw processing system in accordance with some embodiments of the present disclosure.

As shown by FIG. 6, the cleated conveyor 136 may include a cleated surface configured to rotate or move to feed the pine straw layer to the fluffer 130. The conveyor 136 may be positioned at an incline such that it directs the pine straw layer toward the fluffer 130. As noted above, the conveyor can operate at various speeds based on a speed of a motor driving the conveyor 136, such as motor 152 of FIG. 5. The cleated conveyor 136 may be configured to provide the lower portion of the pine straw layer to the hopper 160 for inspection before it is provided to the incline conveyor 112.

Note that the cleated conveyor 136 may be positioned relative to hopper 160 to allow the pine straw layer fed from cleated conveyor 136 to enter the hopper 160 at a desirable angle for inspection and operation of the incline conveyor 112. As the layer enters the hopper 160 a user may inspect the pine straw for unwanted objects and may remove the objects before the pine straw advances on the incline conveyor 112 (e.g., using a pitchfork or otherwise). The hopper 160 may be essentially bin-shaped for containing pine straw, and may have a conveyor belt 170 (or other component for moving the pine straw as desired) for conveying pine straw to incline conveyor 112. The belt 170 may be a separate belt for use only by the hopper 160 (e.g., for feeding straw to the incline conveyor) or may be shared by the hopper and incline conveyor 112 in some embodiments.

Figure 7:
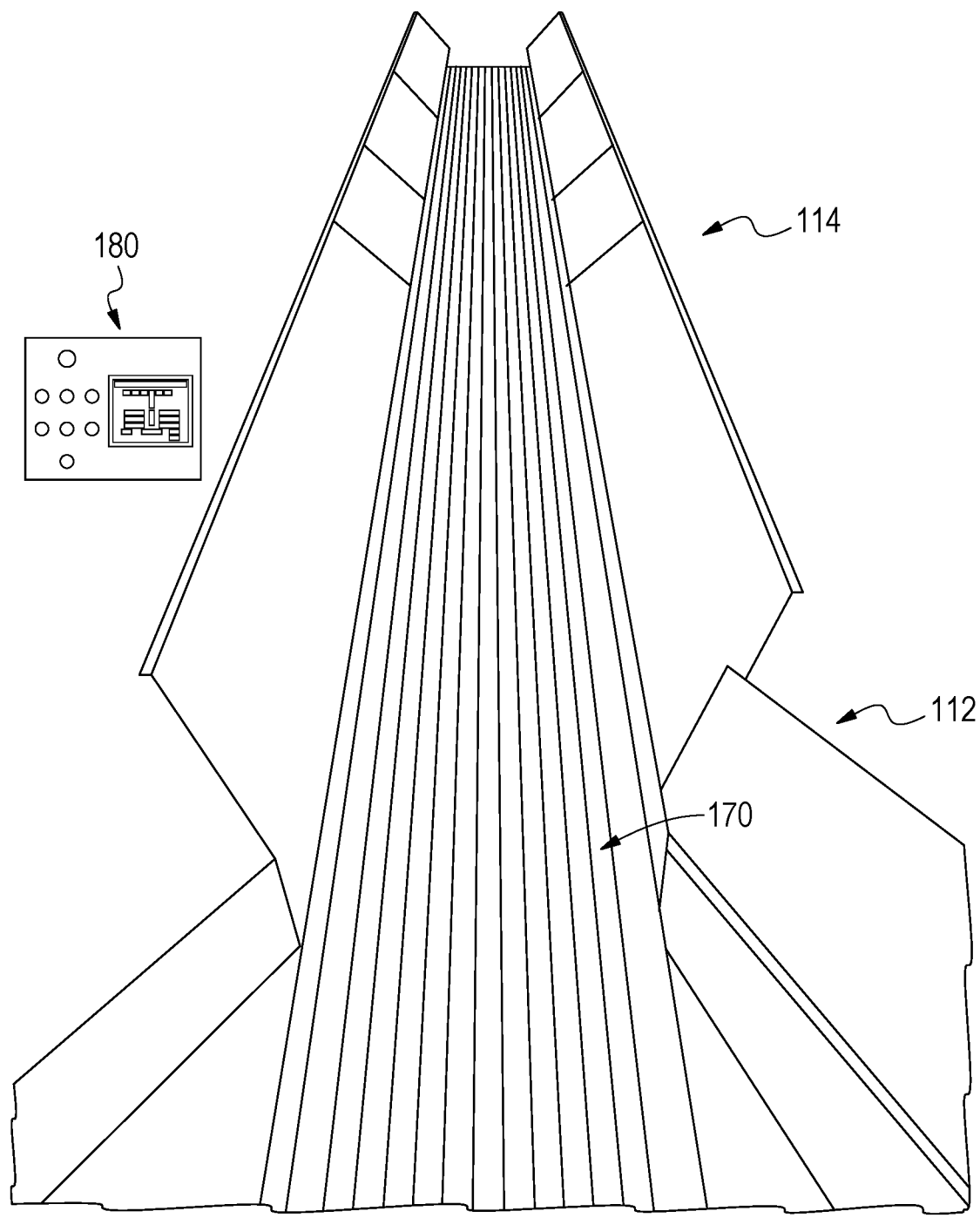
FIG. 7 shows an alternative view of conveyor system of a pine straw processing system in accordance with some embodiments of the present disclosure.

As shown by FIG. 7, incline conveyor 112 may be configured to convey a layer of pine straw at an incline from the hopper 160 to the top of the bagger 20. The layer may have various thicknesses, but in some embodiments, the layer may be approximately 4-6 inches thick when it travels on the incline conveyor 112. The incline conveyor 112 may be inclined at various angles, but in some embodiments, the incline conveyor 112 may have approximately 24 degrees incline relative to a floor on which the conveyor system 10 is positioned, but other angles are possible in other embodiments. Motor 114 may drive conveyor belt 170, may move the pine straw layer at a desired speed based on a speed of the motor 114 (e.g., as controlled by the controller 30). The motor 114 may have various power ratings, but in some embodiments has an approximately 10 hp rating. The incline conveyor 112 may be configured to provide or feed pine straw into an upper portion of bagger 20 when the bagger needs more pine straw for bagging (e.g., as determined based on controllers 32 and 30). In this regard, the incline conveyor 112 may be configured to operate under the control of controller 130, as described further below.

Figure 8:
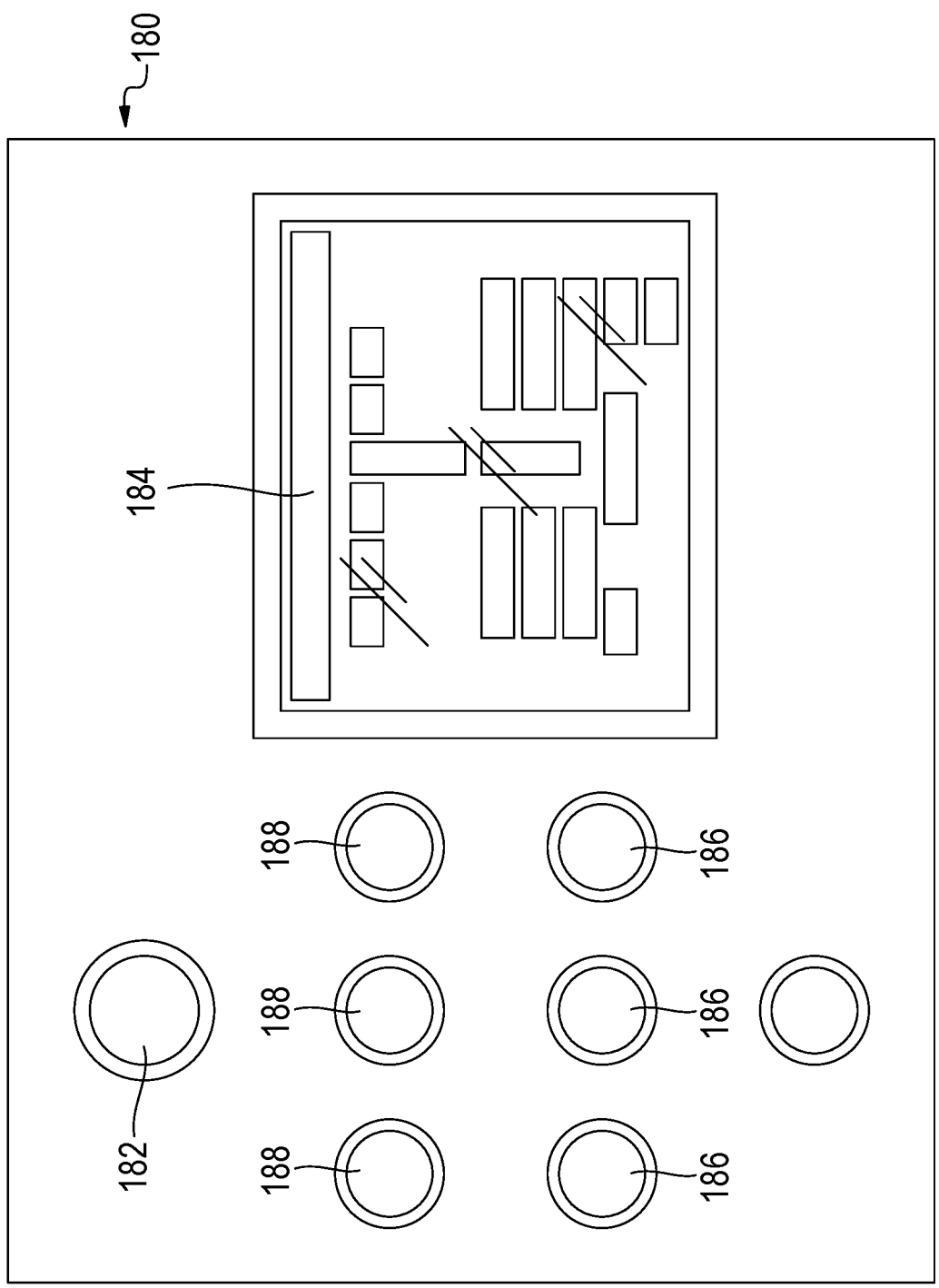
FIG. 8 shows a user interface of a pine straw processing system in accordance with some embodiments of the present disclosure.

FIGS. 7 and 8 also depict a user interface 180. The user interface 180 is in communication with at least controller 30, and may include various components to allow a user to control operation of various components of the system 5 (e.g., conveyor system 10, etc.). In some embodiments, the user interface 180 may be configured to control operation of the various motors of system 5, including conveyor system 10 (e.g., motors 110, 114, 150, 154) and aspiration system 25. The user interface 180 may include controls for controlling speed of a motor (e.g., increasing, decreasing, or maintaining), starting or stopping the motor altogether. In this regard, the user interface 180 may allow a user to control operation of the components of conveyor system 10 by facilitating control of motors of system 10.

Note that the user interface 180 of FIGS. 7 and 8 includes a screen 184 that includes a read-out and various buttons, such as an emergency stop button 182 and start buttons 188 and stop buttons 186 for various motors. The emergency stop button 182 may be configured to provide a signal to controller 30 instructing it to stop some or all operations of the system 5 (e.g., conveyor system 10, bagger 20 and aspiration system 25) when it is actuated. The respective start buttons 188, when actuated, may be configured to provide a signal to controller 30 that will cause it to start a corresponding motor based on the start button 188 that was actuated. Similarly, the respective stop buttons 186, when actuated, may be configured to provide a signal to controller 30 that will cause it to stop a corresponding motor based on the start button 186 that was actuated. Other control inputs are possible in other embodiments, and user interface 180 may be implemented in a variety of techniques using any or various combinations of hardware, software, or otherwise (e.g., when a user interface 180 is implemented as a mobile application on a smartphone or other mobile device).

Screen 184 may be configured to provide information to a user regarding a current status or setting (e.g., speed) at which the components of system 5 are operating at a given time, as well as additional information about the system 5 as may be desired. In some embodiments, the screen 184 may be configured as a touch screen, which may implement some or all of emergency stop button 182 and start buttons 188. Other types of screens may be possible in other embodiments (e.g., a mobile device screen when user interface 180 is implemented as an application on a mobile device).

Figure 9B:
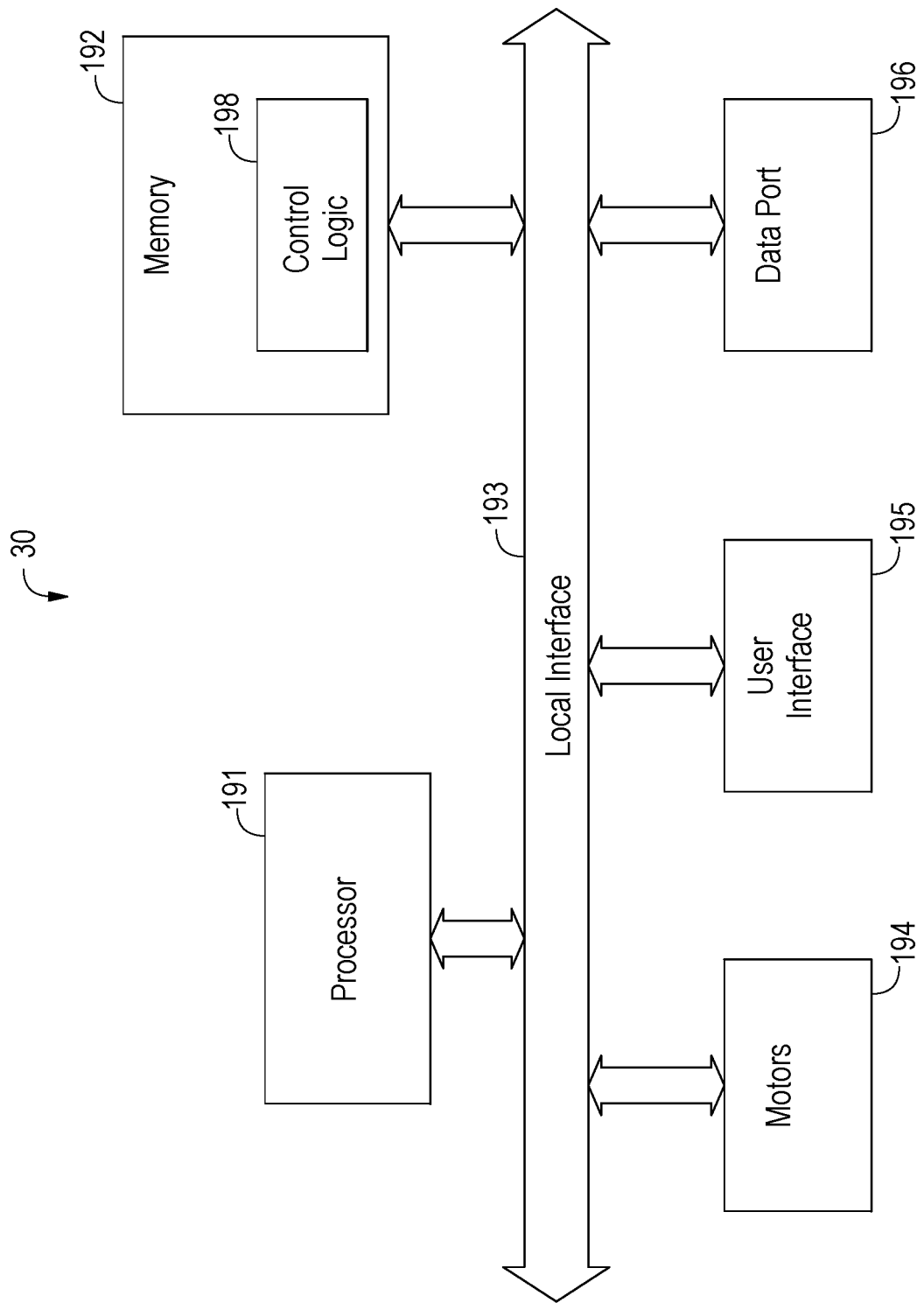
FIG. 9B is a block diagram of a controller of a pine straw processing system in accordance with some embodiments of the present disclosure.

FIGS. 9A and 9B depict a controller 30 in accordance with some embodiments of the present disclosure. Although two separate devices are shown in FIG. 9A, it will be understood by one of ordinary skill in the art that the functionality ascribed to controller 30 herein may be distributed and performed by one or more controllers to achieve the functionality described herein. In addition, although in some embodiments, the controller 30 is implemented as a programmable logic controller (PLC), in some embodiments the controller 30 may be implemented in hardware, software or various suitable or combination thereof.

The exemplary controller 30 depicted by FIGS. 9A and 9B comprises at least one conventional processor 191, such as a digital signal processor (DSP) or a central processing unit (CPU) that communicates to and drives the other elements within the controller 30 via a local interface 193, which can include at least one bus. As an example, the processor 191 may retrieve and execute instructions, such as instructions from the control logic 198, for performing various functions. The control logic 198 may be configured to perform the functionality ascribed herein to the controller 30 and may include any suitable instructions or logic to achieve such purposes.

The controller 30 may be coupled to control any or all of the various motors comprised by the system 5 and described herein, but in some embodiments, the motors 194 comprise the motors of conveyor system 10 and aspiration system 25. Furthermore, a user interface 195, such as user interface 180 or otherwise, can be used to input data from a user of the system 5 and to output data to a user, such as via a display device. In some embodiments, the user interface 195 may be a touchscreen display that is capable of displaying information and receiving inputs from a user, but in some embodiments, the user interface 195 may be separated into devices configured for receiving input and providing output separately. Further, a data port 196 may be used to exchange data with controller 32 or other device, such as a mobile device of a user. In some embodiments, the controller 30 may control operations of the components of the conveyor system 10 and aspiration system 25 based on information received via data port 196. In some embodiments, the data port may include at least one modem, cellular transceiver, or other type of device for communicating via a network (e.g., the internet, LAN, WAN etc.).

As shown by FIG. 9B, the controller comprises control logic 198 for controlling operation of the conveyor system 10 and aspiration system 25 and processing information related to the system 5, including inputs from a user and information from the system 5 (e.g., controller 32) as will be described in more detail hereafter. In the exemplary controller 30 illustrated by FIG. 9B, the control logic 198 is implemented in software along with processing hardware for executing such software, and the control logic 198 is stored in memory 192 of the controller 30. As used herein, memory may refer to any suitable tangible or non-transitory storage medium. Examples of tangible (or non-transitory) storage medium include disks, thumb drives, and memory, etc., but do not include propagated signals. In some embodiments, the control logic 198 may be implemented in hardware, software, firmware, or various combinations thereof to achieve the functionality described herein.

In some embodiments, the control logic 198 may be configured to control any suitable operations of the conveyor system 10 and aspiration system 25, but in some embodiments, the logic 198 may control components of the conveyor system 10 to process and feed pine straw to the bagger 20 when the bagger 20 needs more pine straw. The logic 198 can determine that more pine straw is needed based on a variety of information, such as a signal from controller 32 indicating that additional pine straw is needed for the bagger 20. The logic 198 also may be configured to control a rate at which pine straw is fed to the bagger 20, such as by controlling respective motors 110, 114, 150, 152 of the conveyor system 10. For example, the logic 198 determines that an amount of pine straw fed to the bagger 20 has exceeded a threshold (e.g. approximately 4-5 lbs. of pine straw below a desired weight of pine straw for packaging), such as based on information from the controller 32. The logic 198 may adjust (e.g., decrease) the rate at which pine straw is fed to the bagger 20 while it provides the remaining approximately 4-5 lbs. of pine straw to the bagger 20. When the logic 198 determines that the desired amount of pine straw has been provided to the bagger 20, such as based on information from the controller 32, the logic 198 may stop feeding the bagger (e.g., stop the motors of conveyor system 10).

Note that the logic 198 may be configured to independently control operations within either conveyor system 10 or aspiration system 25 based on information about the system 10. For example the logic 198 may determine operations of the first and second unrollers 102 and 104 may continue, even though a sufficient amount of pine straw has been fed to the bagger 20 and thus, the incline conveyor 112 should be stopped. The logic 198 may permit the unrollers 102 and 104 to continue to operate while stopping the conveyor 112. Similarly, if operation of the incline conveyor can continue, but the unrollers 102 and 104 should stop, the logic 198 may permit the incline conveyor to continue feeding the bagger 20 while the unrollers 102, 104 are stopped. In some embodiments, operations of the various components of conveyor system 10 may be synchronized, such that each component operates while the other components are operating. In some embodiments, the operations of the various components of both conveyor system 10 and aspiration system 25 may be coordinated or synchronized with and dependent upon operation of the bagger 20 such that if the bagger 20 is operating, the conveyor system 10 and aspiration system 25 are also operating. If the bagger 20 is not operating, the logic 198 may stop operations of the conveyor system 10 and aspiration system 25 until the bagger 20 is ready for more pine straw. The logic 198 may control other operations and have other functionality in other embodiments.

In some embodiments, controller 30 (e.g., logic 198) may be configured to control operations of the conveyor system 10 and aspiration system 25 based on operation of bagger 20 and user inputs (e.g., emergency stop), as noted above. In addition to responses based on inputs received from a user via user interface 180, the controller 30 may stop, start, adjust or otherwise control operations of components of the conveyor system 10 and aspiration system 25 based on information about operation of the bagger 20, such as based on information received from controller 32. For example, controller 32 may be configured to monitor operation of the bagger 20 and when a problem is detected (e.g., detection of a malfunction, receipt of an emergency stop signal, etc.) control operation of the bagger 20 in response. If the problem requires operation of the bagger 20 to stop, controller 32 may stop operation of the bagger and may provide an indication to controller 30 that operation of the bagger has stopped. In this regard, controller 30 may stop operation of the conveyor system 10 and aspiration system 25. Controller 32 may be configured to determine that the problem that required operation of the bagger to stop has been resolved, and may provide an indication of that determination to the control 30. In this regard, when controller 32 controls bagger 20 to resume operation, controller 30 may also control layer system 10 and aspiration system 25 to resume operation based on the determination that the bagger 20 is ready for more pine straw and is operating again.

Figure 10A:
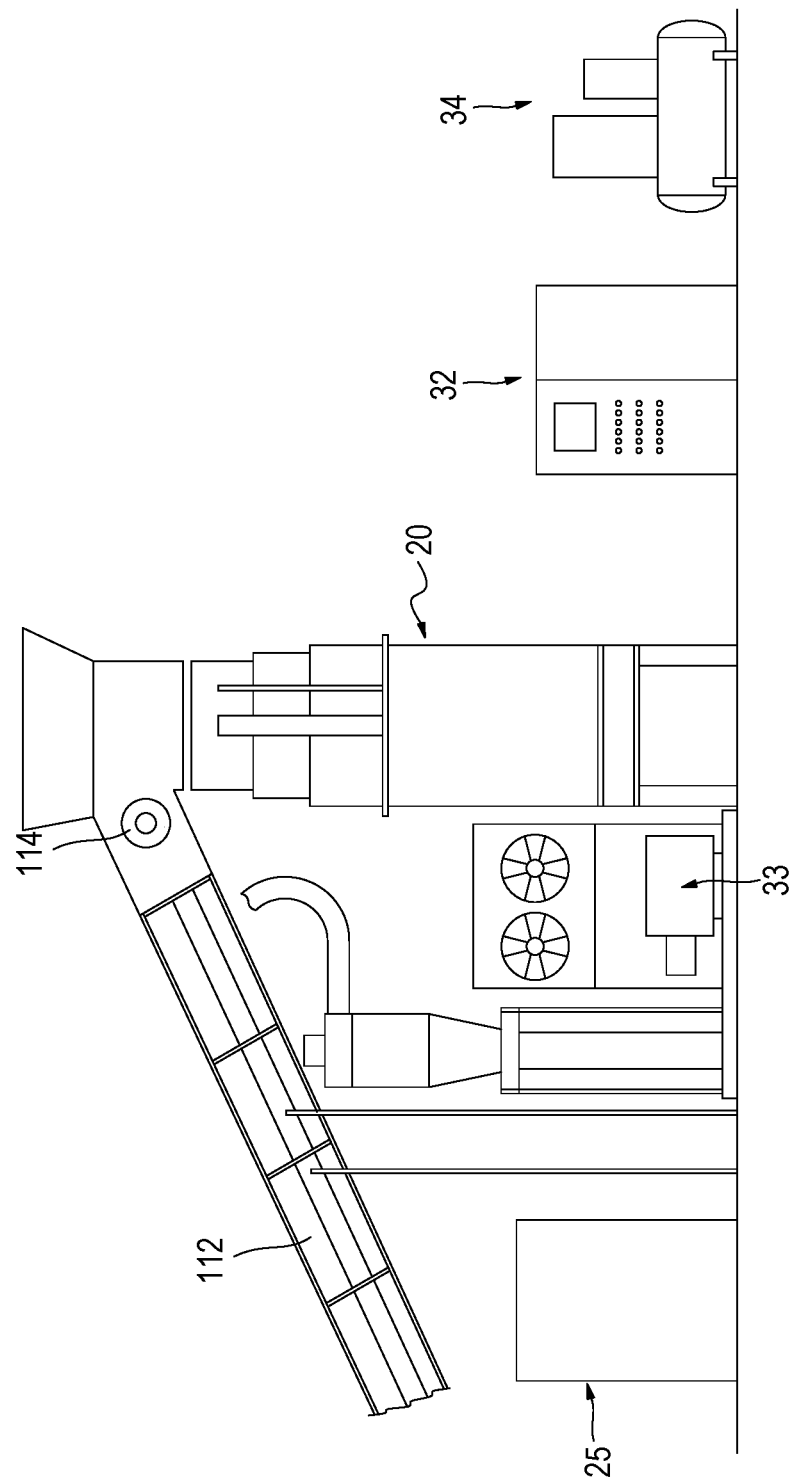
FIG. 10A shows a side-perspective view of a bagger of a pine straw processing system in accordance with some embodiments of the present disclosure.

FIG. 10A depicts an exemplary embodiment of a bagger 20 in accordance with some embodiments of the present disclosure. Bagger 20 is configured to receive pine straw via incline conveyor 112, driven by motor 114. The embodiment of FIG. 10A also depicts controller 32, hydraulics system 33 and compressor system 34. The controller 32 controls operation of the bagger 20 and communicates with controller 30 as described further below. The hydraulics system 33 includes various components for generating and providing hydraulic power to the hydraulically powered components of bagger 20, such as vertical, horizontal compression cylinders and dosing cylinder of the bagger 20. The compressor similarly includes various components for generating and providing pneumatic power to the pneumatically powered components of bagger 20, such as bagging area components, including conveyors, jaws and sealers of the bagger 20. Additional exemplary information regarding operation of bagger 20 may be found in U.S. Patent Application Publication No. 2010/0146908 entitled "APPARATUS AND METHOD FOR COMPRESSING AND BAGGING A LOOSE MATERIAL" and filed on Dec. 11, 2008, which is hereby incorporated by reference into this disclosure in its entirety, U.S. Pat. No. 7,891,156 entitled "Packaging Apparatus and Method of Packaging" and filed on Mar. 24, 2009, which is hereby incorporated by reference into this disclosure in its entirety, as well as U.S. Patent Application Publication No. 2014/0360140 entitled "APPARATUS AND METHOD FOR PLACING BAGS OVER INSERTION TUBE IN BALE ENVELOPING APPARATUS" and filed on Jun. 7, 2013, which is hereby incorporated by reference into this disclosure in its entirety.

Figure 10B:
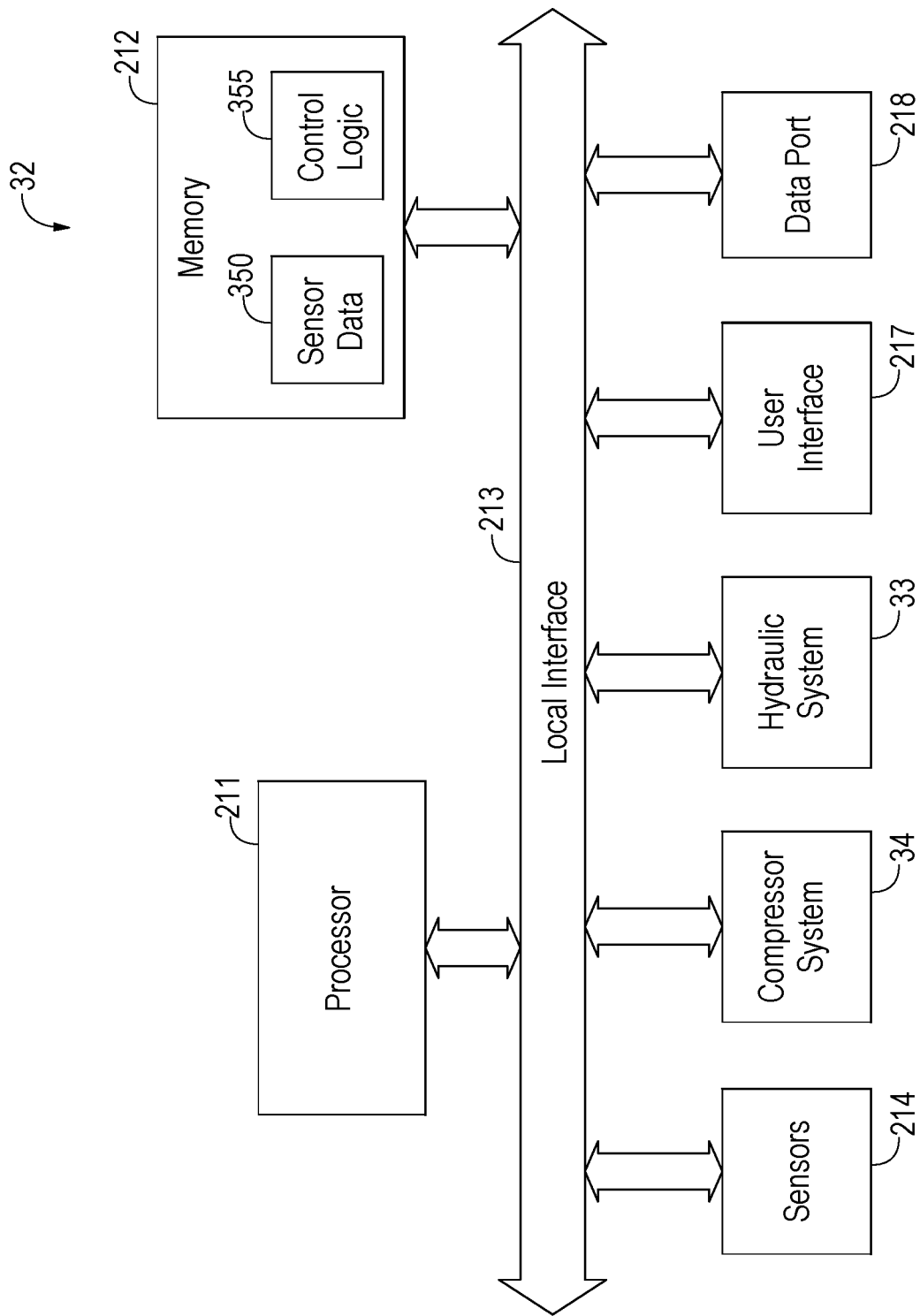
FIG. 10B is a block diagram of a controller of a pine straw processing system in accordance with some embodiments of the present disclosure.
Figure 10C:
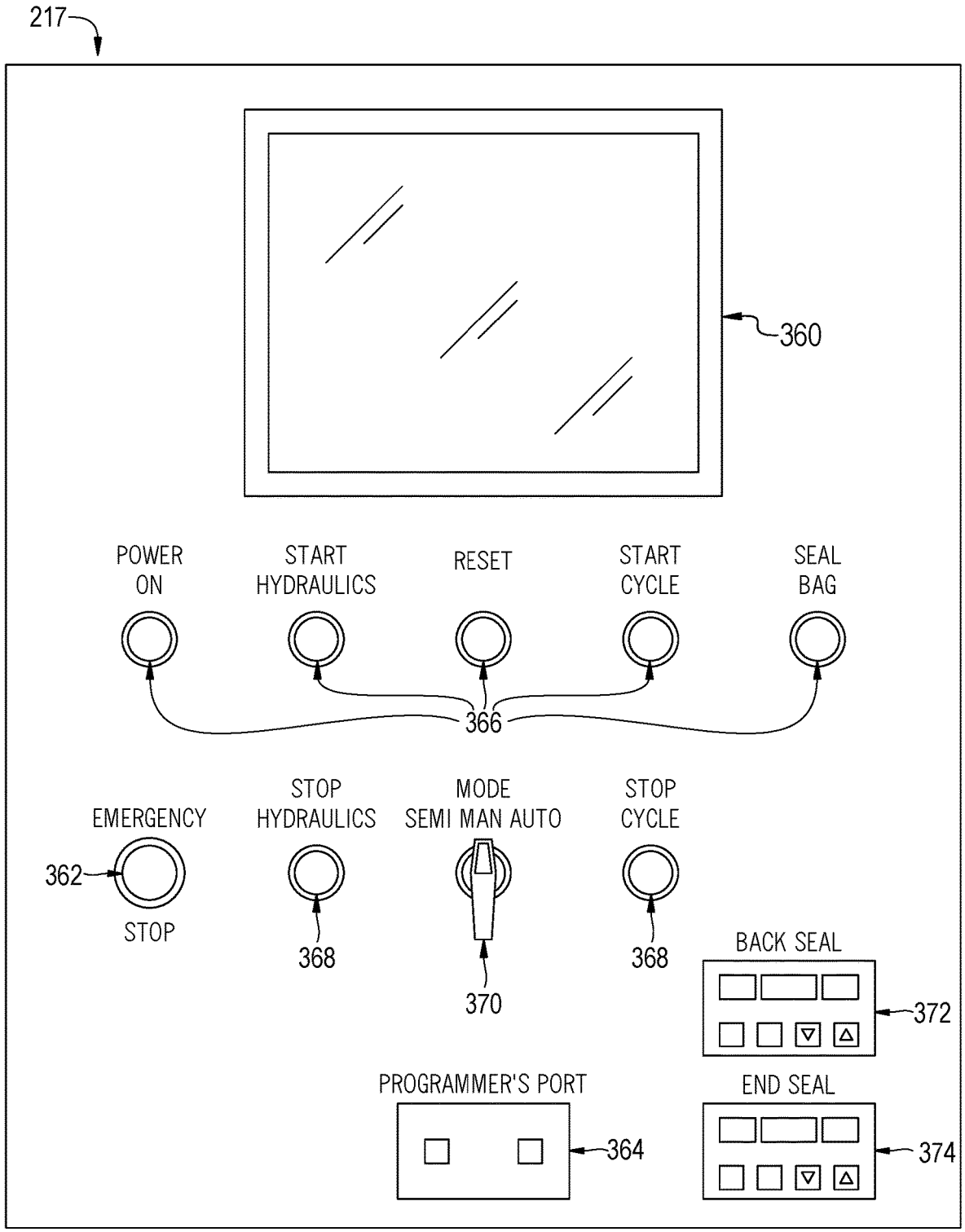
FIG. 10C shows a controller of a pine straw processing system in accordance with some embodiments of the present disclosure.
Figure 11:
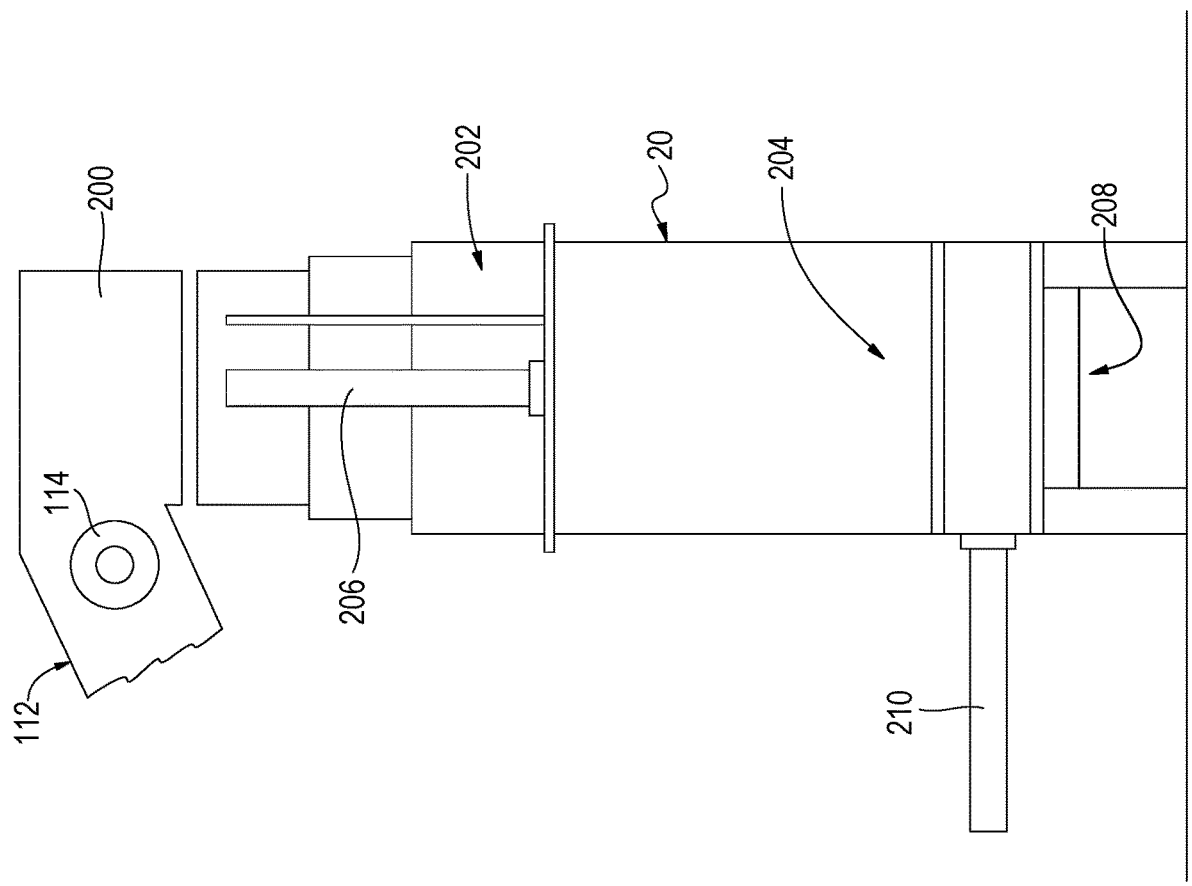
FIG. 11 shows an alternative view of a bagger of a pine straw processing system in accordance with some embodiments of the present disclosure.
Figure 12:
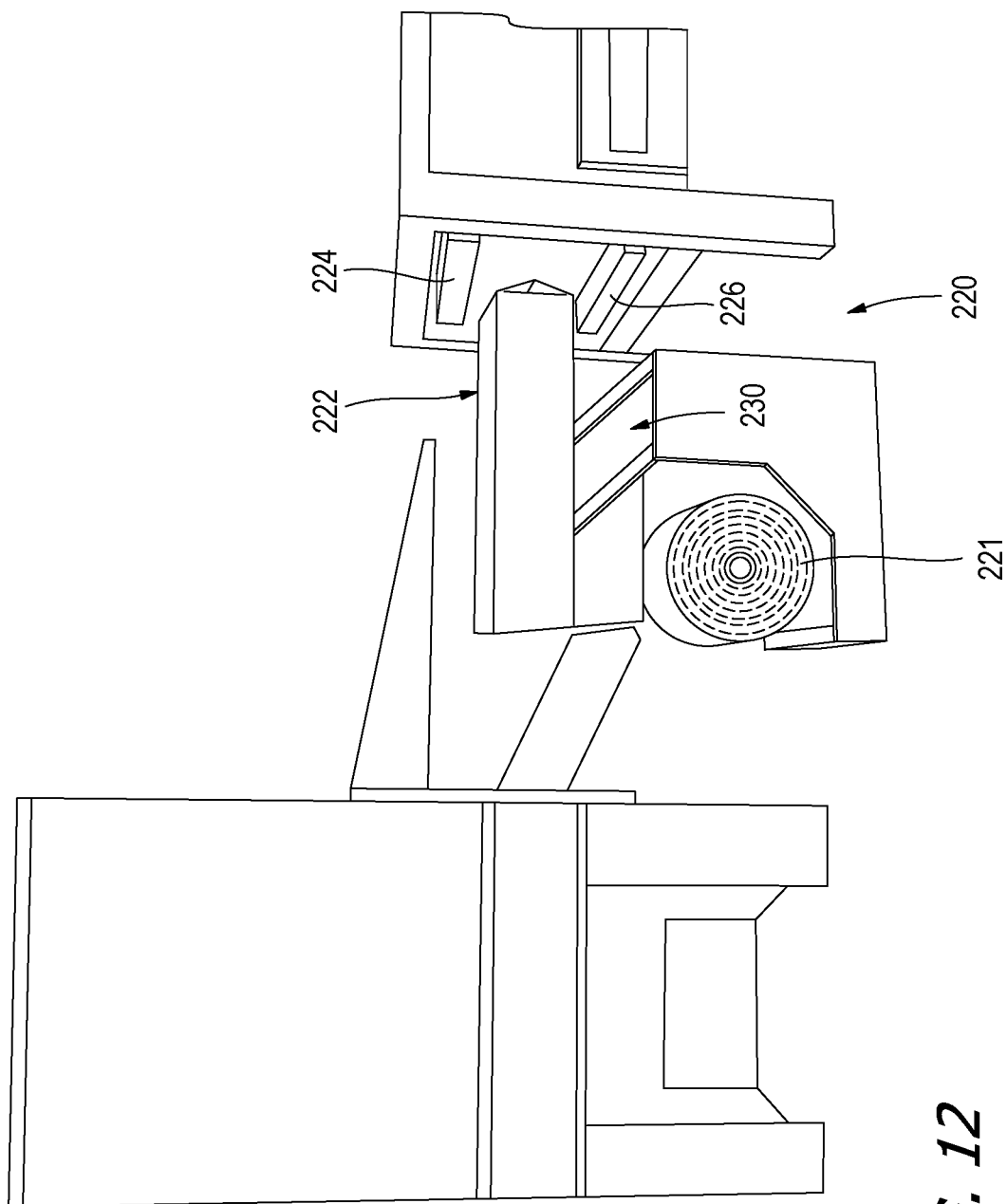
FIG. 12 shows an alternative view of a bagger of a pine straw processing system in accordance with some embodiments of the present disclosure.
Figure 13:
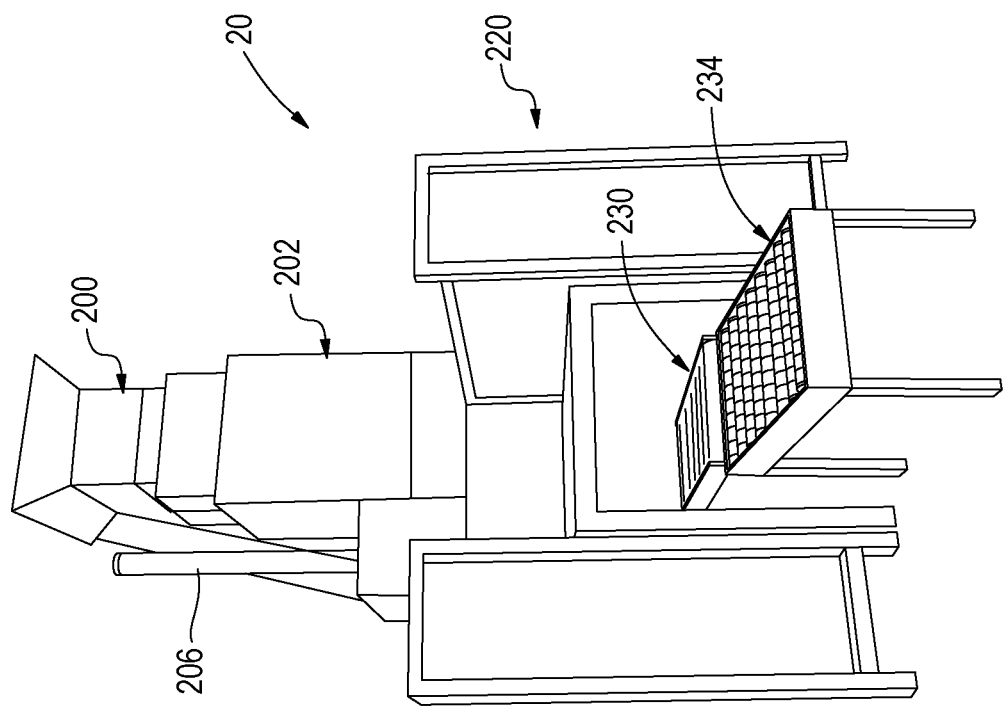
FIG. 13 shows an alternative view of a bagger of a pine straw processing system in accordance with some embodiments of the present disclosure.
Figure 14:
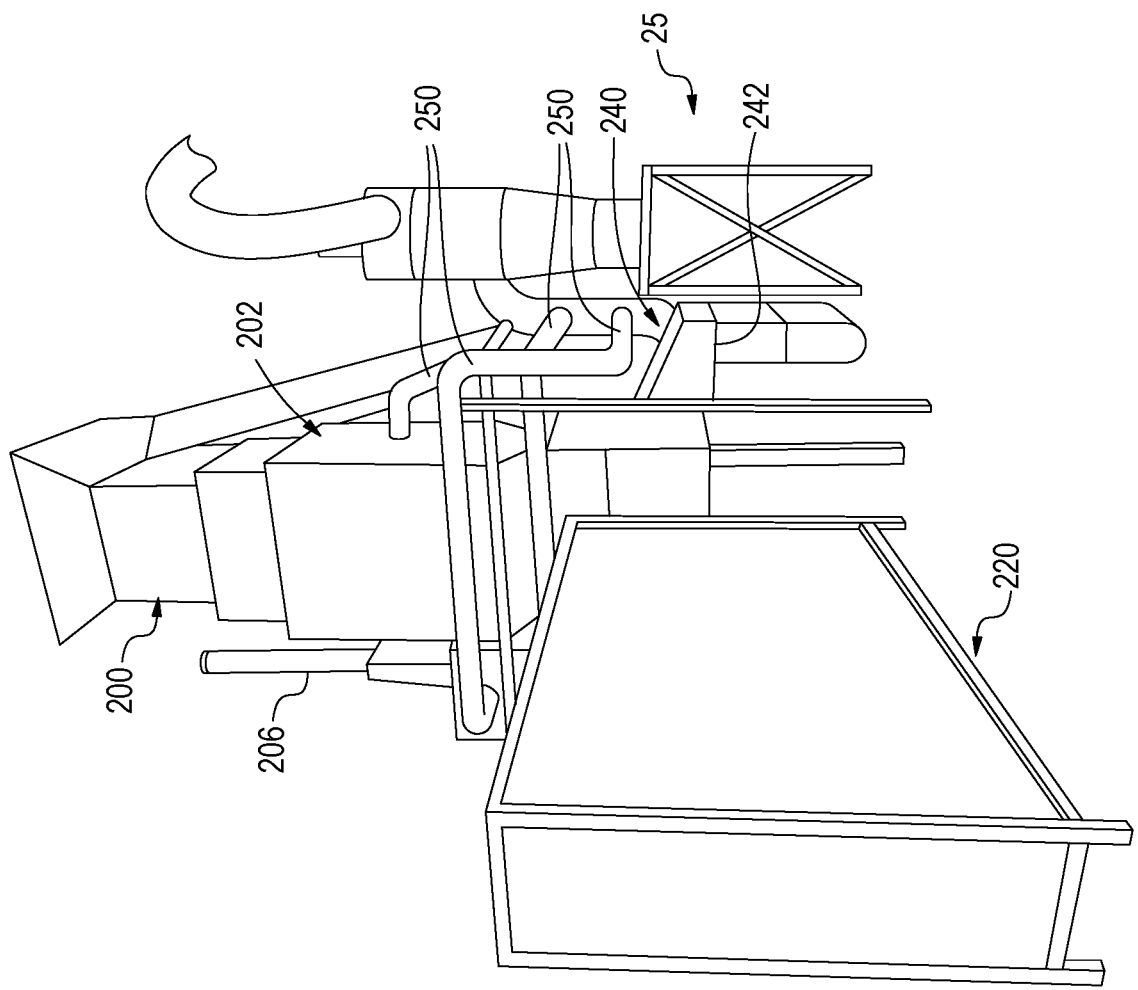
FIG. 14 shows an alternative view of a bagger of a pine straw processing system in accordance with some embodiments of the present disclosure.

FIGS. 10B and 10C depict controller 32 in accordance with some embodiments of the present disclosure. The controller 32 may be coupled to control operation of the bagger 20 and its associated hydraulic system 33 and compressor 34. It will be understood by one of ordinary skill in the art that the functionality ascribed to controller 32 herein may be distributed and performed by one or more controllers in some embodiments to achieve the functionality described herein. In addition, although in some embodiments, the controller 32 is implemented as a programmable logic controller (PLC), in some embodiments the controller 32 may be implemented in hardware, software or various suitable or combination thereof.

The exemplary controller 32 depicted by FIGS. 10B and 10C comprises at least one conventional processor 211, such as a digital signal processor (DSP) or a central processing unit (CPU) that communicates to and drives the other elements within the controller 32 via a local interface 213, which can include at least one bus. As an example, the processor 211 may retrieve and execute instructions, such as instructions from the control logic 355, for performing various functions. The control logic 355 may be configured to perform the functionality ascribed herein to the controller 32 and bagger 20, and may include any suitable instructions or logic to achieve such purposes.

The controller 32 may be coupled to receive signals from various sensors 214 of the bagger 20, such as a weight sensor in a pre-weigh chamber of the bagger 20 that is configured to measure a weight of pine straw fed into the bagger 20 and allow the controller 32 (e.g., logic 355) to control the amount of material fed to the bagger 20 (e.g., when controller 30 controls the conveyor system 10 based on operation of the bagger 20). In addition, sensor data 350 is stored in memory 212 and includes data from various sensors of the bagger 20 in communication with the controller 32, such as weight measurements from a scale in the pre-weigh chamber, positional information for hydraulic cylinders of the compression chamber and doser (e.g., data from "eyes"), information from bagging area, such as sealing efficacy or packaging availability, or information from sensors coupled to the components of hydraulic system 33 and compressor 34. The controller 32 may use the sensor data 350 to make various determinations described herein, and also may control any or all of the various resources of the bagger 20, hydraulics system 33, and compressor 34.

As shown by FIG. 10C, a user interface 217 can be used to input data from a user of the system 5 and to output data to a user, such as via a display device. In some embodiments, the user interface 217 may include a screen 360, which can be a touchscreen display that is capable of displaying information and receiving inputs from a user, but in some embodiments, the user interface 217 may be separated into devices configured for receiving input and providing output separately. The exemplary user interface 217 of FIG. 10C has an emergency stop button 362 that may be used to stop operation of the bagger 20 (thereby halting operation of the conveyor system 10 and aspiration system 25). A programmer's port 364 may be configured to allow programming of controller 32 (e.g., troubleshooting, upgrades, logic modification, etc.) and may comprise various types of hardware for establishing a wired or wireless data connection (e.g., Ethernet, USB, Firewire, Bluetooth, etc.). The interface 217 also may include various buttons 366 to allow a user to provide inputs to control powering and starting operations of components of bagger 20, such as responding to actuation by providing a signal to controller 32 that will cause the controller to power up the bagger 20, start hydraulic system 33, resetting a function of the bagger 20, starting a bagging cycle, sealing a bag, or otherwise. The user interface 217 also may include buttons 368 configured to stop hydraulic system 33 and stop a bagging cycle. A selector switch 270 may allow a user to select an operating mode for the bagger 20, such as a semi-automatic, automatic or manual mode or other mode. Further, sealing controls 372 and 374 may be configured to receive inputs for controlling components of the bagging area of the bagger 20 for bagging and sealing of bags of pine straw.

In addition, a data port 218 may be used to exchange data with controller 30 or other device, such as a mobile device of a user. In some embodiments, the data port may include at least one modem, cellular transceiver, or other type of device for communicating via a network (e.g., the internet, LAN, WAN etc.).

As shown by FIGS. 10B and 10C, the controller comprises control logic 355 for controlling operation of the bagger 20 and processing information related to the system 5, including inputs from a user and information from the system 5 (e.g., controller 32) as will be described in more detail hereafter. In the exemplary controller 32 illustrated by FIGS. 10B and 10C, the control logic 355 is implemented in software along with processing hardware for executing such software, and the control logic 355 is stored in memory 212 of the controller 32. As used herein, memory may refer to any suitable tangible or non-transitory storage medium. Examples of tangible (or non-transitory) storage medium include disks, thumb drives, and memory, etc., but do not include propagated signals. However, in some embodiments, the control logic 212 may be implemented in hardware, software, firmware, or various combinations thereof to achieve the functionality described herein.

The logic 355 also may be configured to detect problems associated with operation of the bagger 20 and respond appropriately. The logic 355 may be configured to assess the nature of the problem (e.g., malfunction, emergency stop input, etc.) based on information provided to the controller 32 (e.g., via sensors 214, user interface 217 or otherwise). For example, the logic 355 may determine that the bagger 20 has malfunctioned (e.g., a component has become inoperable, such as when pine straw or other material has obstructed or clogged an area, etc.). The logic 355 may respond by stopping the bagger 20. The logic 355 may be configured to determine that a problem has occurred based on user inputs (e.g., actuation of emergency stop button 362). If the problem requires that the bagger 20 stop operations temporarily until the problem is resolved, the logic 355 may stop the bagger 20 and its respective hydraulic system 33 and compressor 34 temporarily. The logic 355 may take various other actions in response to problems detected during operation of the bagger 20 in other embodiments.

In some embodiments, the control logic 355 may be configured to perform bagging operations by controlling various aspects of system 5, but in some embodiments, the logic 355 may control controlling bagger 20, hydraulics 33 and compressor 34 in order to achieve the functionality ascribed herein to each. The logic 355 also may control other components of system 5 in other embodiments.

An exemplary operation of bagger 20 will be described with reference to FIGS. 11-14. Incline conveyor 112 may feed pine straw to the receiving chute 200 bagger 20. The receiving chute 200 may be configured to receive pine straw from incline conveyor 112 and provided to pre-weigh chamber 202. Although the receiving chute 200 of FIGS. 11-14 is depicted as having a substantially rectangular cross-section, other cross-sectional shapes and dimensions are possible. After the pine straw has been provided to receiving chute 200, it may pass to pre-weigh chamber 202 where the pine straw may remain until a desired weight of pine straw has been accumulated in the pre-way area for bagging. In some embodiments, desired weight for a bag of pine straw may be approximately 15-19 lbs. A user may provide an input to the controller 32 of bagger 20 (e.g., via interface 217) to select a desired bag weight. The conveyor system 10 may feed pine straw to the bagger 20 until the selected bag weight has been accumulated in the pre-weigh chamber 202. A bag weight may be determined using other techniques in other embodiments.

In some embodiments, controller 32 may be configured to monitor weight of pine straw as it accumulates in the pre-weight chamber 202. Pre-weigh chamber 202 may include various suitable components, such as a scale or other sensors, for estimating or measuring weight of pine straw as it is fed into the receiving chute 200 and accumulates pre-weigh chamber 202. In some embodiments, pre-weigh chamber 202 has a scale (e.g., a sensor 214) that communicates weight readings to controller 32.

The controller 32 may monitor a weight of pine straw that has accumulated in the free weight area 202, and may determine whether the weight has exceeded a threshold, such as approximately between 3-4 lbs. below the desired bag weight of compressed pine straw. In response, the controller 32 may slow the feed of pine straw that is provided to pre-way chamber 202 from the incline conveyor 112 via the receiving chute 200, such as by providing a signal to controller 30. The controller 30 may reduce the rate at pine straw is conveyed by incline conveyor 112 and fed to receiving chute 200 and pre-weigh chamber 202. The incline conveyor 112 may continue to feed pine straw at the reduced rate until the desired weight of pine straw has been received at the pre-weigh chamber 202, when the controller 32 may provide an indication to controller 30 to stop feeding pine straw to the bagger 20.

Next, the pine straw may be provided to a compression chamber 204 for compression. In some embodiments, the bagger 20 may feed the pine straw from pre-weigh area 202 to compression chamber 204 by opening doors (not specifically shown) or otherwise moving the pine straw to the compression chamber 204. The pine straw may be provided to the compression chamber 204 by other techniques in other embodiments.

After the pine straw has been provided to the compression chamber 204, the pine straw may undergo a compression cycle that may result in compression of the pine straw from essentially all sides. The compression chamber 204 may include a plurality of compression cylinders or rams, such as vertical cylinder 206, horizontal cylinder 210, and doser 240. The compression cylinders 206, 210, and 204 may be hydraulically powered and may include suitable components (e.g., plates, walls, etc.) for performing compression of the pine straw, but can be powered using other techniques in other embodiments. In some embodiments, the vertical cylinder 206 may be actuated during the compression cycle to provide vertical wall compression of the pine straw within the compression chamber 204, such as from a top side of the compression chamber 204. The horizontal cylinder 210 may be actuated during the compression cycle to provide horizontal wall compression of the pine straw within the compression chamber 204, such as from a left, right, forward or back side of the compression chamber 204. The doser 240 may be actuated during the compression cycle to provide a doser wall (e.g., horizontal wall) compression of the pine straw within the compression chamber 204. The doser wall compression may be complimentary to compression provided by the horizontal cylinder 210, such as from a left, right, forward or back side or wall of the compression chamber 204. In this regard, each of the compression cylinders 206, 210 and 240 may be configured to provide compression to the pine straw within the compression chamber 204, although various numbers of compression cylinder may be implemented in other embodiments.

Note that compression chamber 204 may have various dimensions and may be configured to withstand various pressures as part of the compression cycle. In some embodiments, the cylinders 206, 210 and 240 may be configured to provide compression at a pressure between approximately 1750 and 2000 pounds per square inch (psi), but other pressures are possible in other embodiments. In addition, the compression cycle may be configured to perform various compressions using cylinders 200 section 210, but an example embodiment, the compression cycle may comprise two horizontal compressions, and one vertical compression. Note also that a compression chamber door 208 may be positioned adjacent to the compression chamber 204 to provide access and facilitate cleaning of the compression chamber 204 and removal of additional unwanted debris that has been left behind following a compression cycle.

Following the compression cycle, the compressed pine straw may be inserted compressed into a packaging sleeve from a packaging roll 221 to form a compressed package 222, which may be sealed in bagging area 220. Components of the bagging area 220 may be configured to insert the compressed pine straw into the packaging sleeve from the packaging roll 221 before the compressed pine straw can "rebound" or expand beyond its compressed dimensions. After the compressed straw has been inserted into the packaging sleeve, the compressed package may be conveyed on a conveyor 230 toward a sealing area, where an upper sealing jaw 224 and lower sealing jaw 226 may converge toward one another to meet and seal a first end of the compressed package 222. Thereafter, the conveyor 230 may advance the compressed package 222, and upper sealing jaw 224 and lower sealing jaw 226 may converge to seal a second end of the compressed package 222. Thereafter, conveyor 230 may advance the compressed package 222 having its first end and second end sealed to a roller station 234, where the compressed package 222, as depicted in FIGS. 21 through 27, may be available for a user to retrieve for transport or storage.

Note that although various bag sizes are possible, the compressed package 222 of pine straw may be approximately 24" by 18" by 14" after both ends have been sealed. The controller 32 may be configured to allow a user to adjust or otherwise modify bag dimensions (e.g., such as when a size of packaging sleeve changes based on adjustments to bag weight, etc.), such as using user interface 217. The compressed package 222 may have various other sizes, which may be selected by a user using various other techniques other embodiments.

Note also that an aspiration system aperture 242 may be positioned adjacent to doser 240, and may be configured to include one or more doors (not specifically shown in FIGS. 11-14). The doors may be positioned adjacent to the aspiration system aperture 242 to facilitate cleaning and clearing of debris and microdust that otherwise may become compacted and obstruct or impair function of the aspiration system 25. Other numbers and positions of doors may be possible in other embodiments to facilitate clearing of the aspiration system aperture 242.

FIGS. 14-17 depict various views of an exemplary embodiment of aspiration system 25. Aspiration system 25 is configured to use suction to remove air carrying loose debris (e.g., small or broken pieces of pine straw, other loose debris not previously removed) and microdust from pine straw while it is in the bagger 20 and filter the debris and dust for disposal. The aspiration system 25 may remove loose debris from the bagger 20 by providing suction (e.g., negative pressure) to desired portions of the bagger 20 via plurality of pipes 250. The suction may be sufficient to pull loose debris and microdust from the pine straw for disposal while leaving the pine straw within the bagger 20 for bagging. The system 25 may include filtering elements such as cyclone 300 and aspirator 320 to perform filtering of the debris and microdust.

Figure 15:
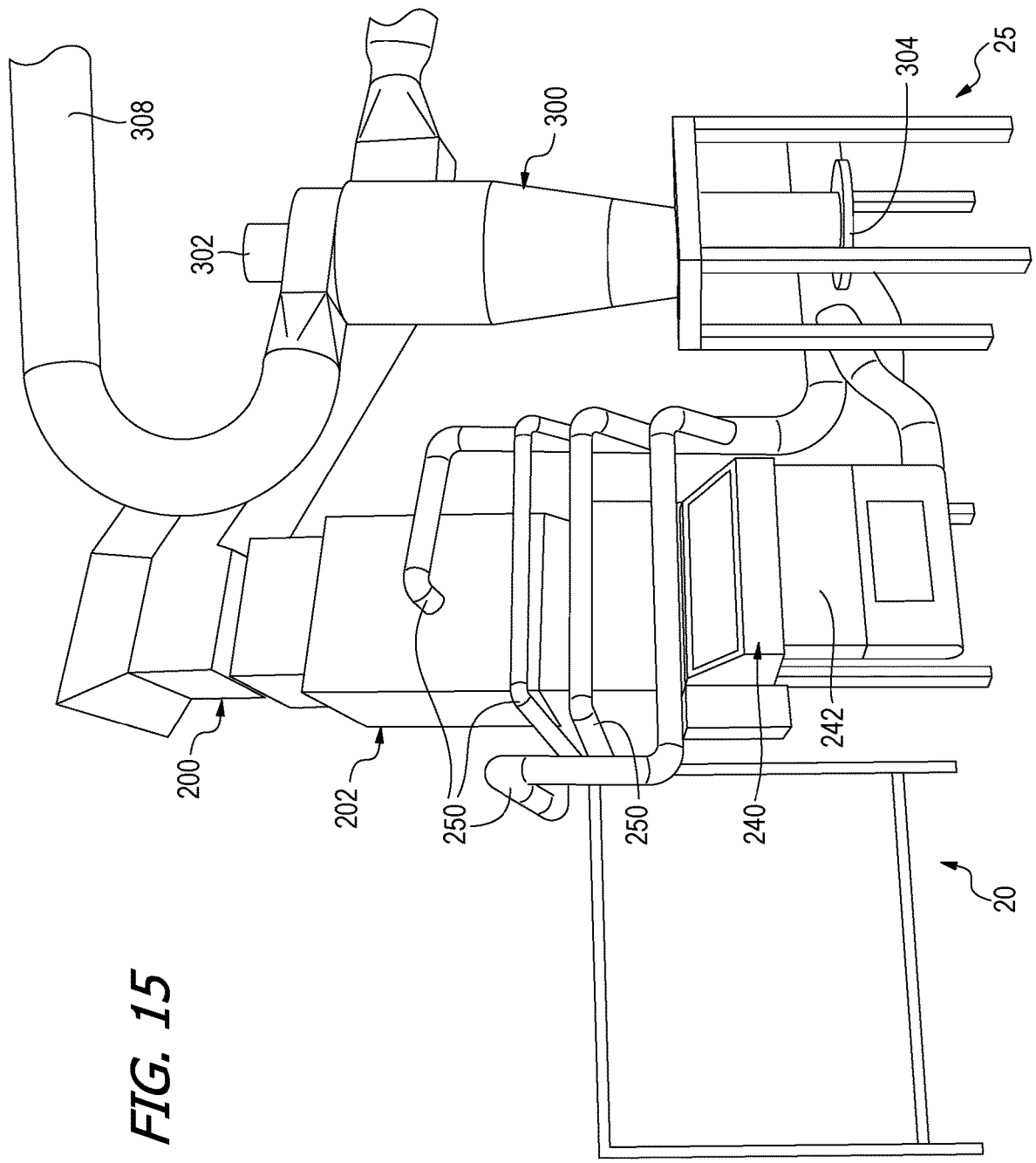
FIG. 15 shows an alternative view of a bagger and aspiration system of a pine straw processing system in accordance with some embodiments of the present disclosure.
Figure 16:
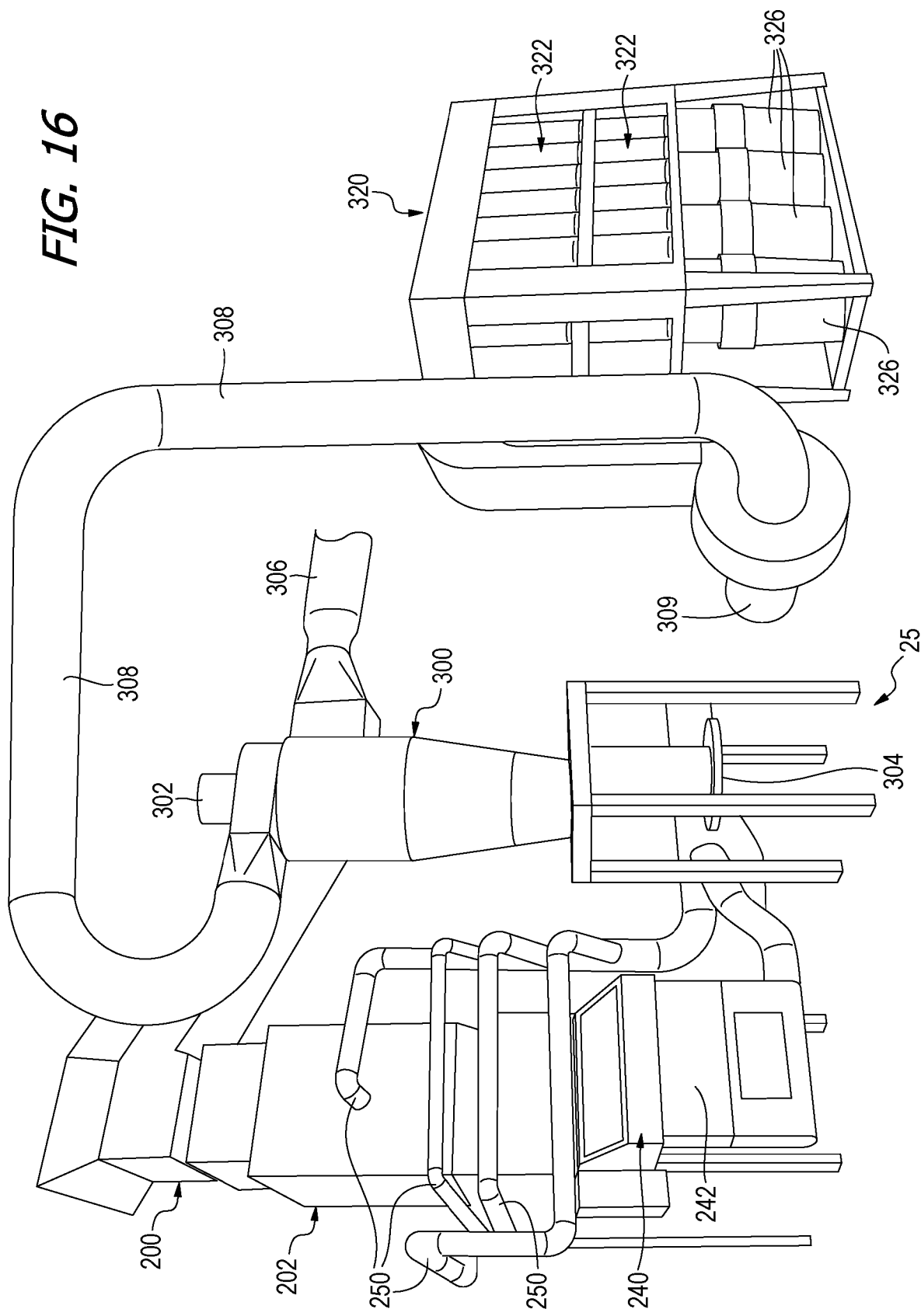
FIG. 16 shows an alternative view of a bagger and aspiration system of a pine straw processing system in accordance with some embodiments of the present disclosure.
Figure 17:
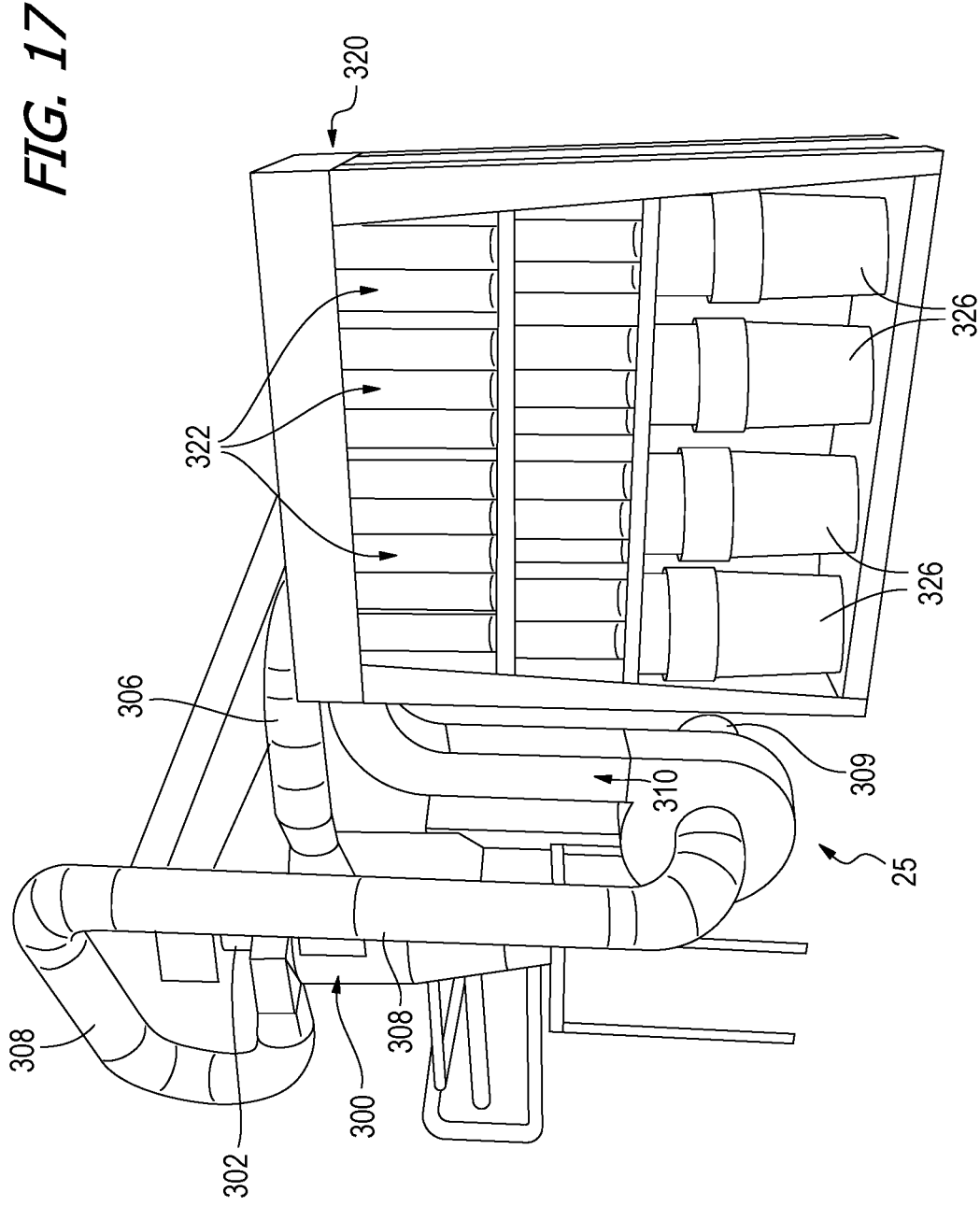
FIG. 17 shows an aspiration system of a pine straw processing system in accordance with some embodiments of the present disclosure.

The embodiment aspiration system 25 of FIGS. 15-17 includes various components (e.g., motors, fans, ducts, filters, etc.) configured to provide suction to the bagger 20, receive debris and microdust from the bagger 20, filter the debris and microdust and provide it for disposal. Suction may generated and provided to bagger 20 via various pipes (described below) using at least one motor, such as motors 302 and 309. Motor 309 may be coupled to aspirator 320, and may be controlled by controller 30. Motor 302 may be coupled to cyclone 300. Motors 302, 309 may be controlled by controller 30 as described above, and may be configured or modified as desired to achieve desired characteristics for aspiration system 25, such as to maintain a desired flow rate through the aspiration system 25 (e.g., approximately 4000 cfm or other rate), such as based on material that is being processed and bagged. For example, motor 302 may be configured to operate at a frequency of approximately 30 Hz when pine straw is being processed and bagged, but at a frequency of approximately 15 Hz when wheat straw is processed and bagged. Other speeds and frequencies are possible in other embodiments.

Pipes 250 may be coupled to the bagger 20 at various locations to achieve removal of debris at desired times during the bagging process. A pipe 250 may be coupled to each of pre-weigh area 202, compression area 204, bagging area 220, and doser area 240, although a pipe 250 may be coupled to provide suction to various other desired areas on and off the bagger 20 in other embodiments. The pipes 250 may have suitable characteristics (e.g., diameter, material, etc.) to achieve desired functionality, such as to maintain a desired flow rate or otherwise.

The pipes 250 each may be coupled to channel suction and receive the loose debris from the bagger 20 before providing it to cyclone pipe 306. Aspiration aperture 242 is also coupled to receive loose debris and provide it to the cyclone pipe 306. The cyclone pipe 306 may be coupled to receive the loose airborne debris and channel it before providing it to the cyclone 300 for filtering. The cyclone 300 may include components for filtering (e.g., removing) loose debris carried through air sucked from the bagger 20. In some embodiments, the cyclone 300 may include a centrifugal or other filter for removing loose debris from the air. Debris filtered by the cyclone 300 may be deposited into a container via debris chute 304 of cyclone 300 for disposal (e.g., by falling from the cyclone 300 under force of gravity or otherwise).

After air provided to the cyclone 300 has been filtered to remove lose debris, the air still may have microdust and other particles that can be filtered by the aspirator 320. The air filtered by the cyclone 300 may be may be provided from the cyclone 300 to a connecting pipe 308, which may be coupled to provide the air to an aspirator intake 310. The connecting pipe 308 may channel the air to provide it to aspirator intake 310, which may receive the air and direct it to aspirator 320 for further filtering of microdust and particles.

The aspirator 320 may receive air from the aspirator intake 310 and may further filter microdust and particles not previously filtered by the cyclone 300. For example, the aspirator 320 use filters (not specifically shown) to filter microdust and small particles from the air it receives. The aspirator 320 may include a plurality of microdust tubes 322 for receiving microdust and small particles filtered by the aspirator 320 and providing the microdust and small particles to one or more microdust disposal bins 326, which may be a 55-gallon drum or other suitable container. The bins 326 may be removable for emptying as needed. After the aspirator 320 has filtered the microdust and small particles from the air, it may expel the air into the environment or may return the air to a desired portion of system 5 for use with other applications.

Note that, although FIGS. 14-17 depict motor 302 as being positioned between cyclone 300 and connecting pipe 308, the motor 302 may be coupled to provide suction at other suitable locations. Similarly, although motor 309 is depicted as being positioned adjacent to aspirator intake 310, the motor 309 may likewise coupled to provide suction at various other locations of the aspiration system 25. Similarly, it will be understood by one of ordinary skill in the art that arrangements, positions and couplings of the various components of aspiration system 25 may be rearranged or modified in various ways using known techniques to achieve the functionality described herein.

Additional exemplary information regarding operation of aspiration system 25 may be found in U.S. Pat. No. 5,954,849 entitled "FILTER ELEMENT" and filed on Sep. 30, 1997, which is hereby incorporated by reference into this disclosure in its entirety, U.S. Pat. No. 5,803,941 entitled "FILTER ELEMENT" and filed on Oct. 23, 1995, which is hereby incorporated by reference into this disclosure in its entirety, as well as U.S. Pat. No. 5,931,988 entitled "CABINET FILTER ASSEMBLY AND METHODS" and filed on Dec. 4, 1997, which is hereby incorporated by reference into this disclosure in its entirety.

Figure 19:
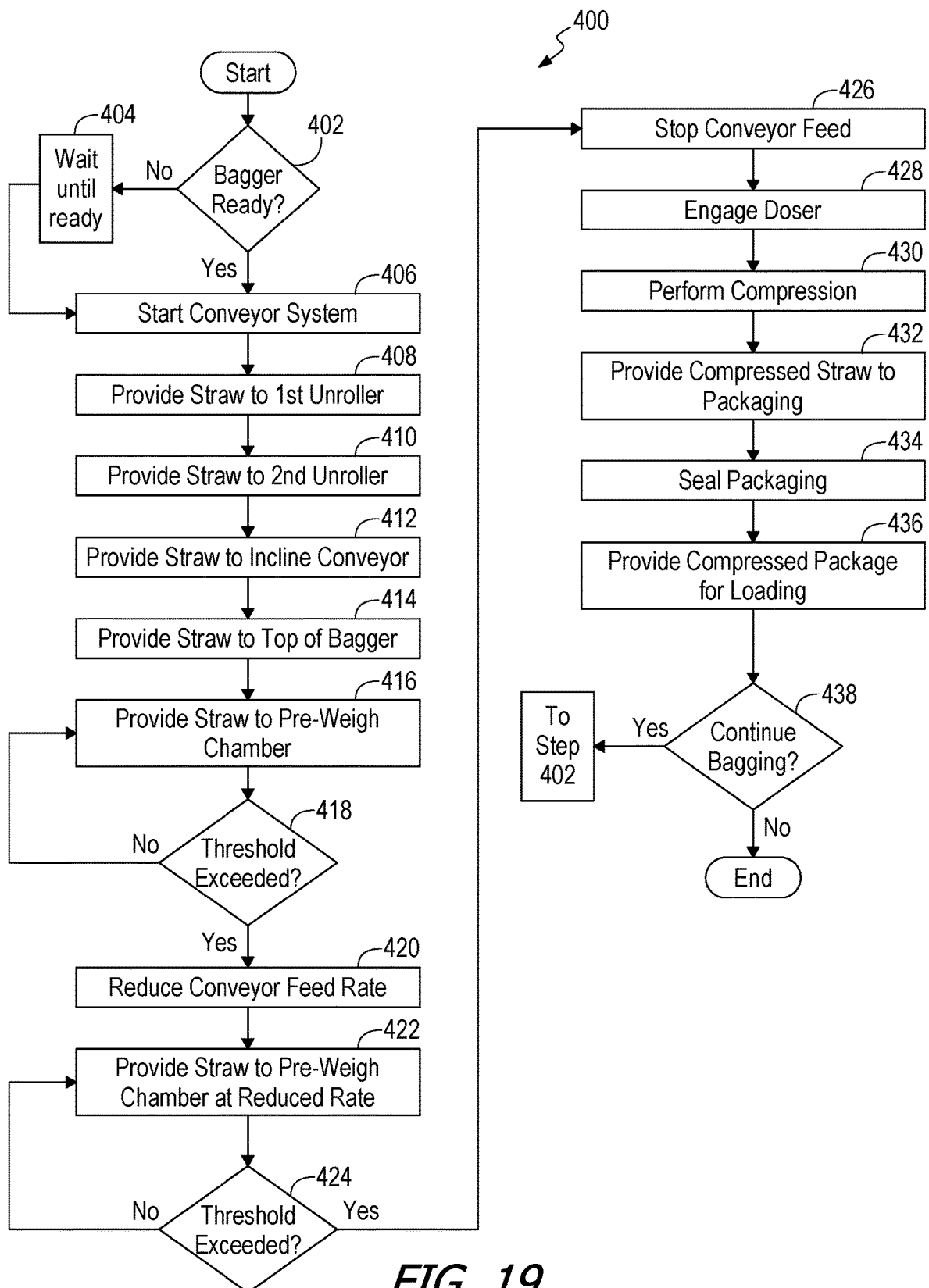
FIG. 19 depicts a non-limiting flow diagram illustrating exemplary methods for processing pine straw in accordance with some embodiments of the present disclosure.

FIG. 19 depicts a non-limiting flow diagram illustrating exemplary methods for processing pine straw in accordance with some embodiments of the present disclosure. Data flow 400 may begin at step 402, where a determination may be made bagger 20 is ready to receive pine straw, such as by controller 30. If the controller 30 determines that the bagger 20 is ready, processing may proceed to step 406 at which the conveyor system 10 start in vain pine straw. If controller 30 determines that bagger 20 is not ready, processing may proceed to step 404, where the controller 30 may wait to start the conveyor system 10 until it receives an indication that the bagger 20 is ready to receive more pine straw, after which processing will proceed to step 406.

After the conveyor system 10 has been started, at step 408, pine straw may be provided to first unroller 102 from a conveyor 116 of loading deck 100. The conveyor of loading deck 100 may provide a layer of pine straw of varying thickness (e.g., approximately 18-24 inches) to the first unroller 102. The layer may be received by a cleated conveyor 126 of the first unroller 102 which may advance the layer of pine straw toward the first fluffer 120. The fluffer 120 may fluff a first portion of the layer, while leaving a second portion of the layer unfluffed. The unfluffed second portion may have various thicknesses, but in some embodiments, the unfluffed second portion of the layer may have a thickness of approximately 10 inches. After the fluffer 120 has fluffed the first portion of the layer, at step 410, cleated conveyor 126 may then provide the second portion layer together with any of the fluffed straw that has fallen onto second portion of the layer during fluffing to the second unroller 104.

Second cleated conveyor 136 may advance the layer of pine straw provided at step 410 toward second fluffer 130, which may engage a third portion of the layer of pine straw and fluff the third portion of the layer pine straw. A fourth portion of the layer of pine straw may not be engaged by the second fluffer 130, and may pass below the fluffer 130 as it is moved by the second cleated conveyor 136. The fourth portion may have a thickness of approximately 2-2.5 inches after the third portion of the pine straw layer has been fluffed. The second cleated conveyor may provide the fourth portion of the layer and any of the pine straw from the fluffed third portion that has fallen onto the fourth layer to a hopper 160 for inspection and quality control, and processing may proceed to step 412.

At step 412, the straw may be provided from the hopper 160 to incline conveyor 112. The incline conveyor 112 may be driven to convey the pine straw from the hopper 160 toward the top of the bagger 20. At step 414, the incline conveyor 112 may provide the pine straw to the top of the bagger 20, such to receiving chute 200. Thereafter, at step 416, the pine straw may be provided to pre-weigh chamber 202. Processing may proceed to step 418.

At step 418, a determination may be made as to whether a threshold weight has been exceeded for the pre-weigh chamber 202, such as by controller 32. The threshold weight may be indicative of a weight that is below the desired weight for bag of pine straw, such as approximately 4-5 lbs. below the desired bag weight. If threshold has not been exceeded, processing may return to step 416 where additional pine straw may be provided to the pre-weigh chamber 202. If the threshold has been exceeded, processing may proceed to step 420, where a speed of the incline conveyor 112 may be reduced in order to reduce a rate at which pine straw is fed into the bagger 20. Thereafter, processing may proceed to step 422, where pine straw may be provided at the reduced rate by the incline conveyor 112 to the pre-weigh chamber 202 via receiving chute 200. Thereafter processing may proceed to step 424.

At step 424, a determination may be made as to whether a threshold associated with a desired bag weight has been exceeded, such as based on weight of accumulated pine straw within the pre-weigh area 202 as sensed by a scale of the pre-way area 202. If the threshold has not been exceeded, processing may return step 422 where additional pine straw may be provided to the pre-weigh chamber 202 at the reduced feed rate. However, if the threshold has been exceeded, processing may proceed to step 426, where the conveyor feed may be stopped. Note that the determination at step 424 may be made by controller 32, which may provide an indication of the determination to controller 30.

Thereafter, at step 428, the compression process may begin when the pine straw is provided to the compression chamber and a hydraulic cylinder such as doser 240 is engaged to begin compressing the pine straw. At step 430, additional hydraulic cylinders (e.g., vertical and horizontal cylinders 206, 210) may begin to compress the pine straw as part of a compression cycle. Note that hydraulic cylinders providing compression may be engaged either essentially simultaneously, in sequence, or other desired combinations. After the hydraulic cylinders have performed the compression, at step 432, the compressed pine straw may be provided compressed to a packaging sleeve, forming compressed packaging 222.

At step 434, the compressed packaging 222 may then be provided to the bagging area 220 of bagger 20. The compressed package 222 may be sealed in the bagging area 220, and then at step 436, may be provided to a user such as by advancing along a conveyor 230 to a roller system 234. After the compressed package 222 has been provided for loading at step 436, processing may proceed to step 438

At step 438, a determination may be made (e.g., by controller 32) as to whether bagging should continue. If bagging should continue, processing may return to step 402. If bagging should not continue, thereafter, processing may end.

Figure 20:
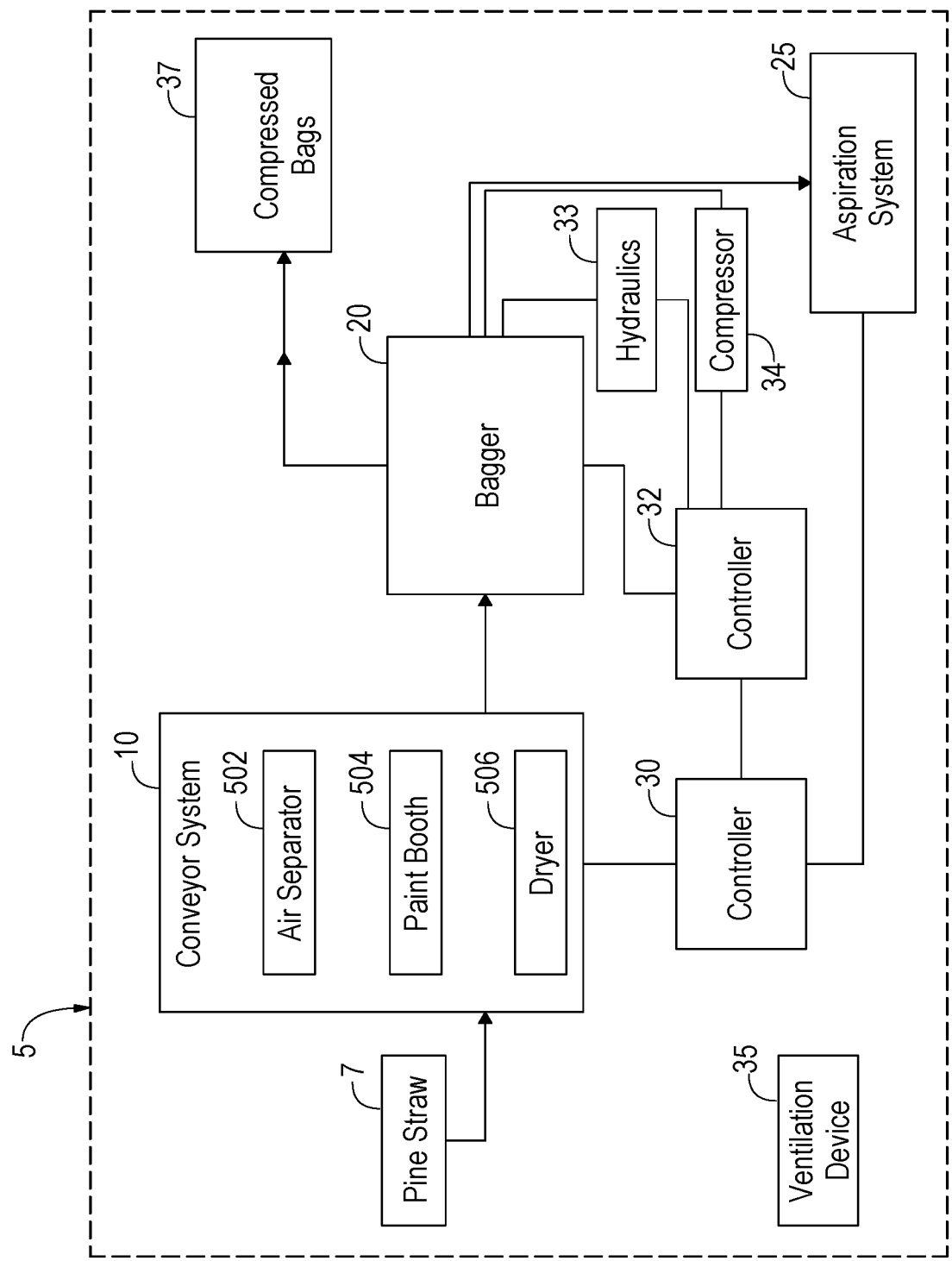
FIG. 20 is a block diagram of an alternative embodiment of a pine straw processing system in accordance with some embodiments of the present disclosure.
Figure 21:
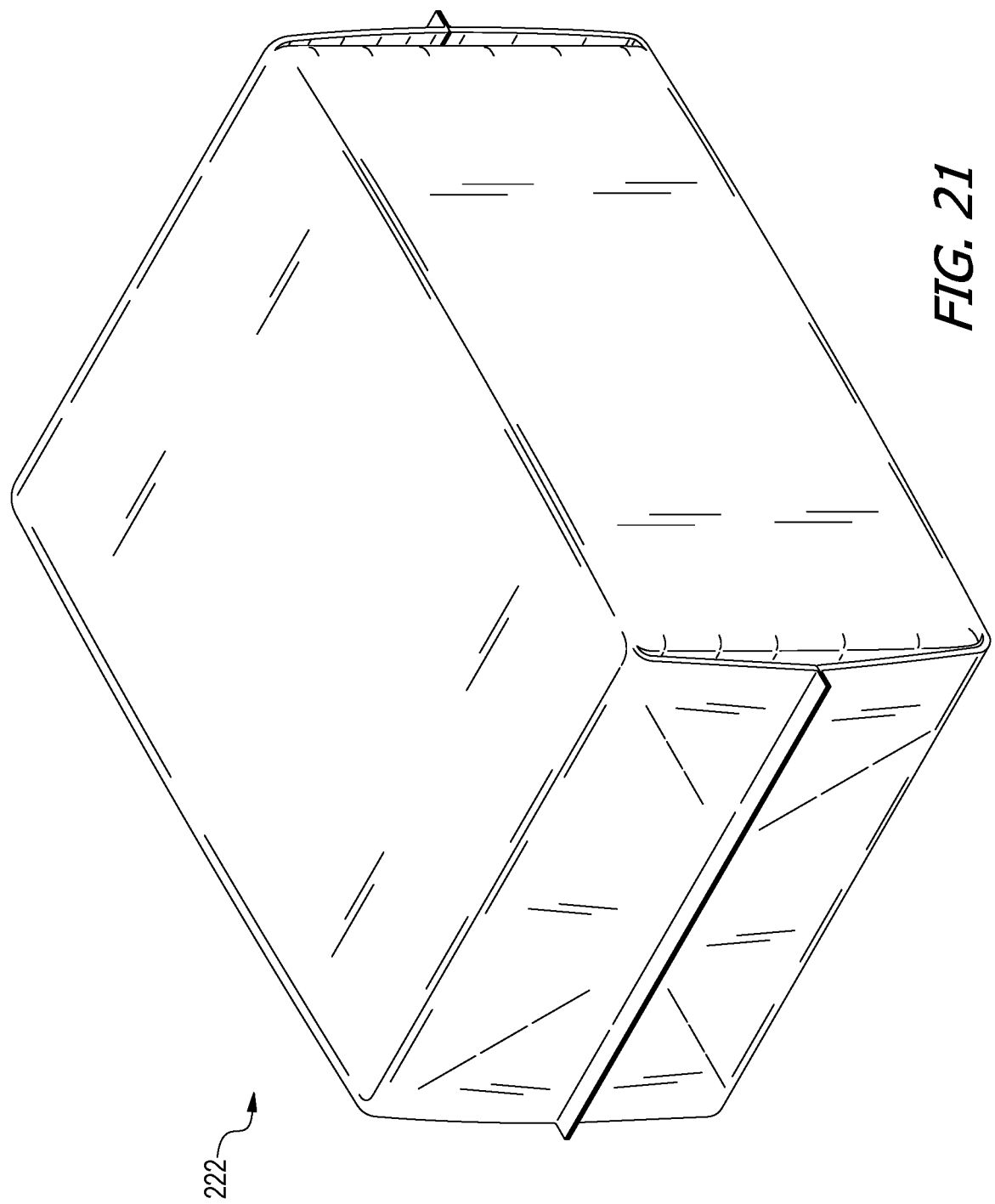
FIG. 21 is a perspective view of the packaged compressed pine straw mass.
Figure 22:
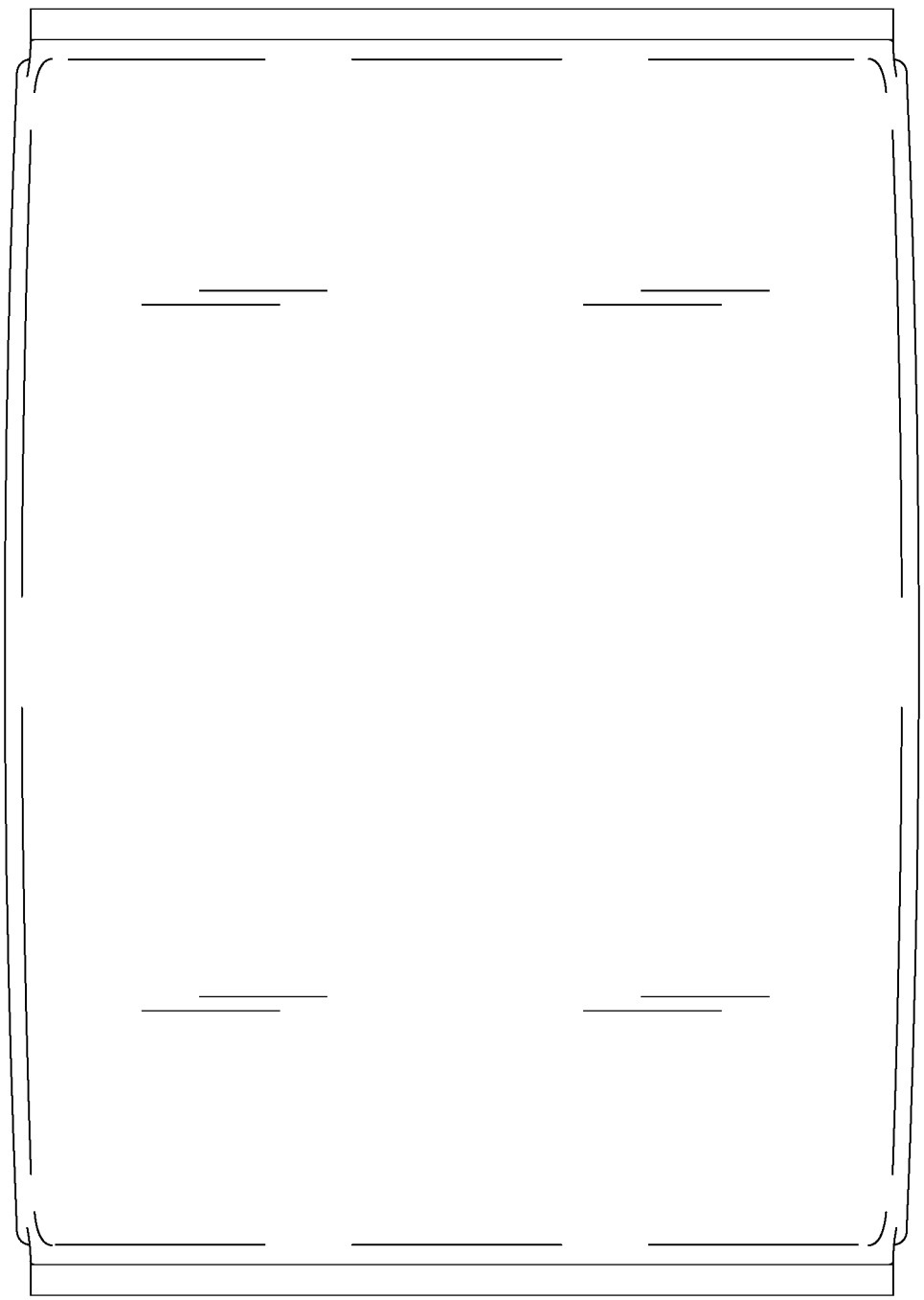
FIG. 22 is a top plan view of the packaged compressed pine straw mass.
Figure 23:
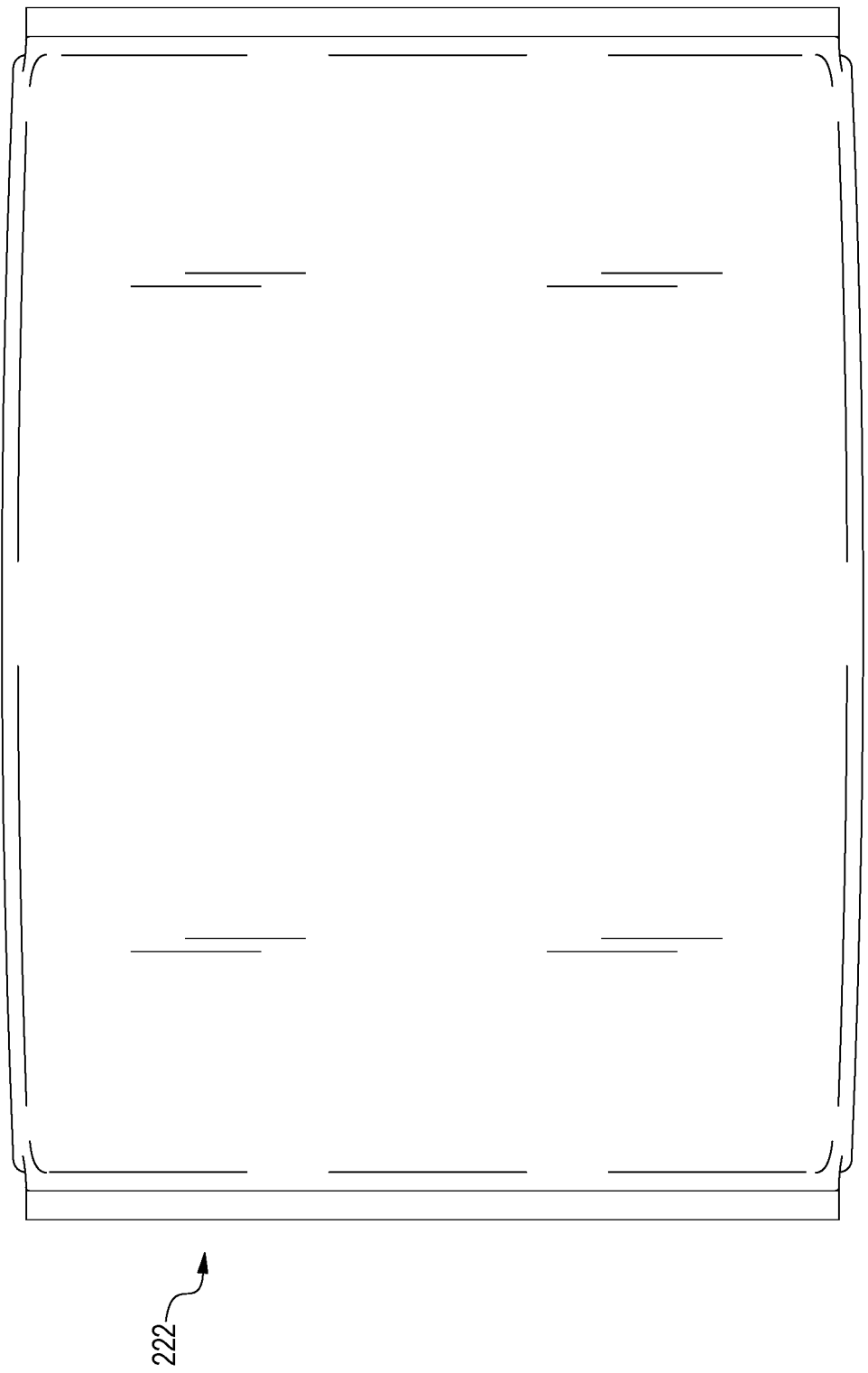
FIG. 23 is a bottom plan view of the packaged compressed pine straw mass.
Figure 24:
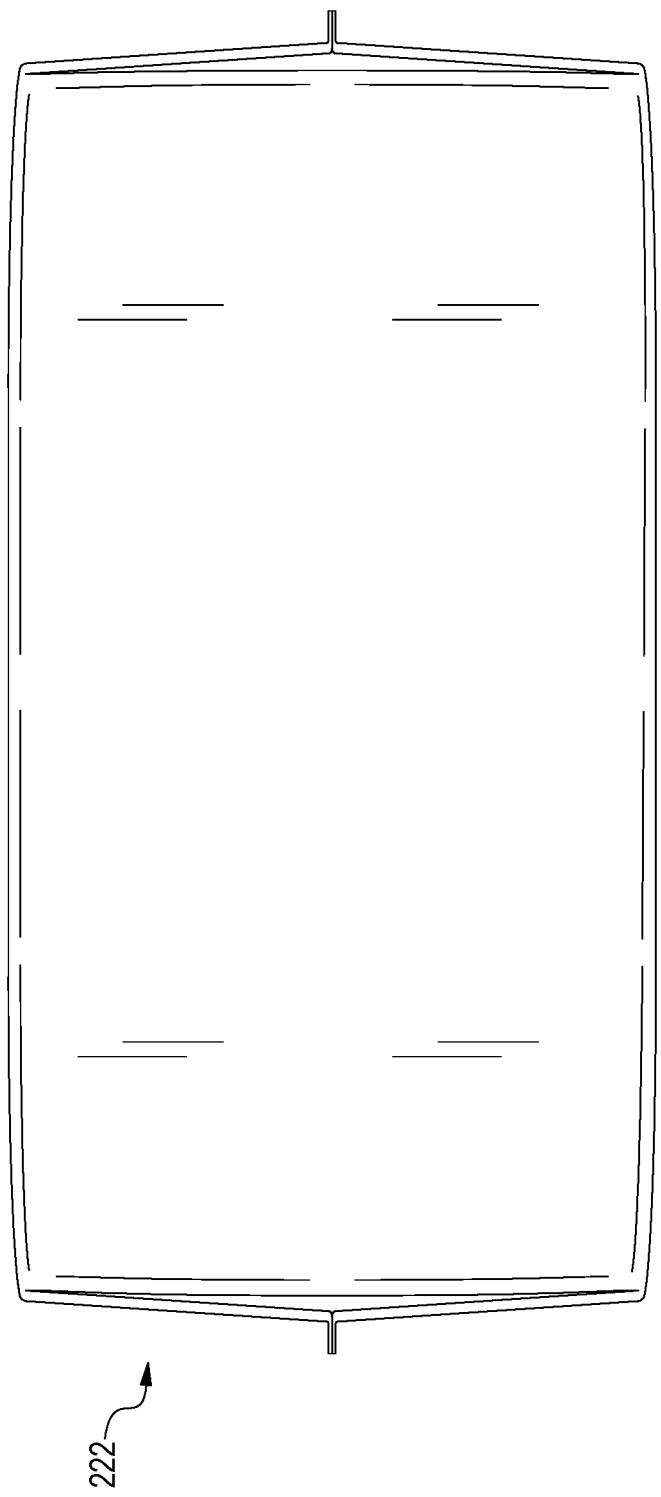
FIG. 24 is an elevational view of a first side of the packaged compressed pine straw mass.
Figure 25:
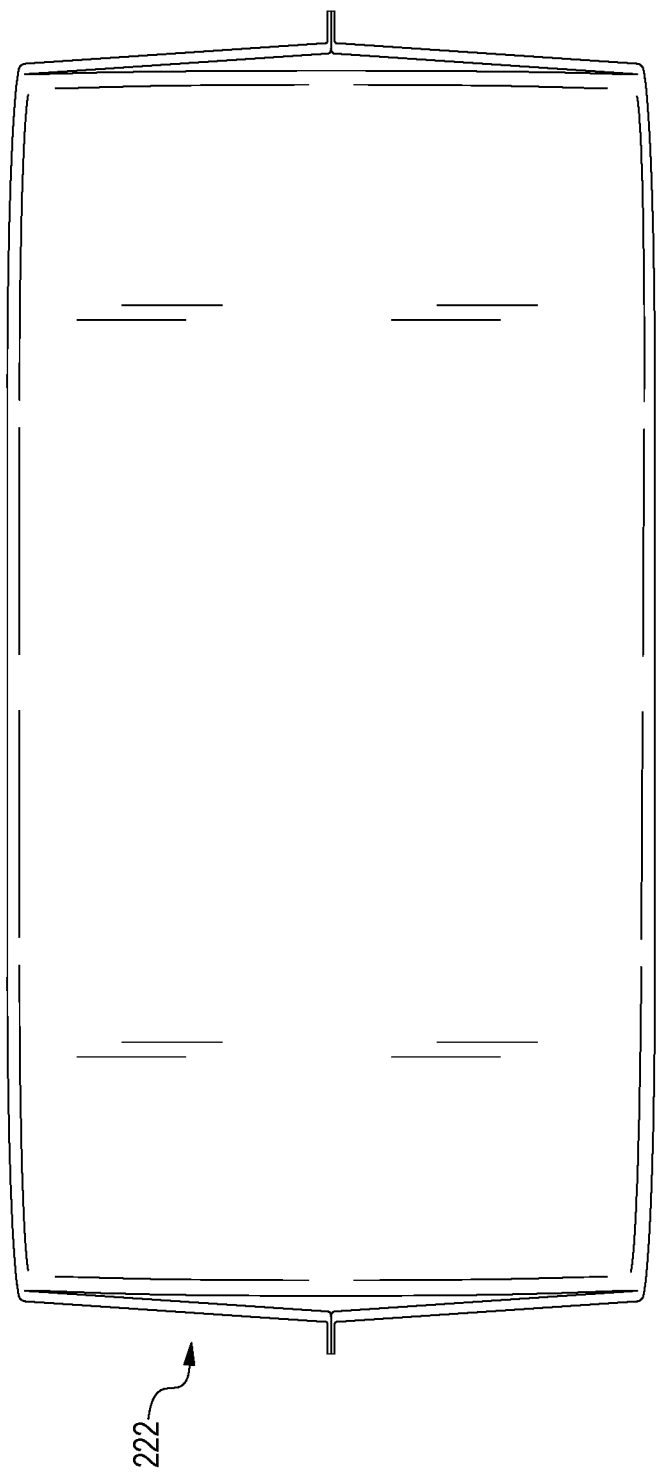
FIG. 25 is an elevational view a second side of the packaged compressed pine straw mass.
Figure 26:
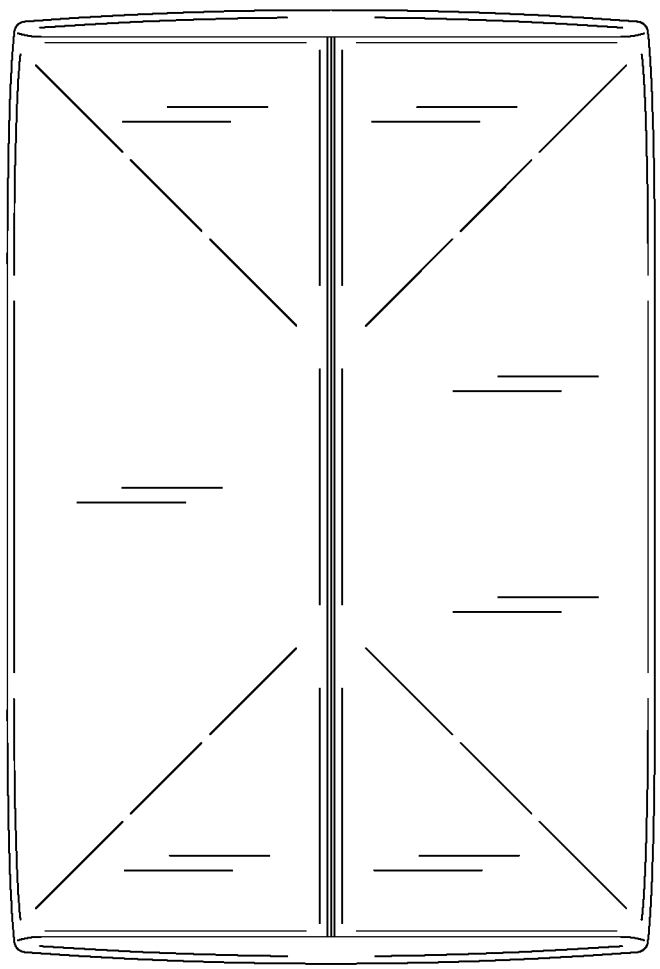
FIG. 26 is an elevational view of a first end of the packaged compressed pine straw mass.
Figure 27:
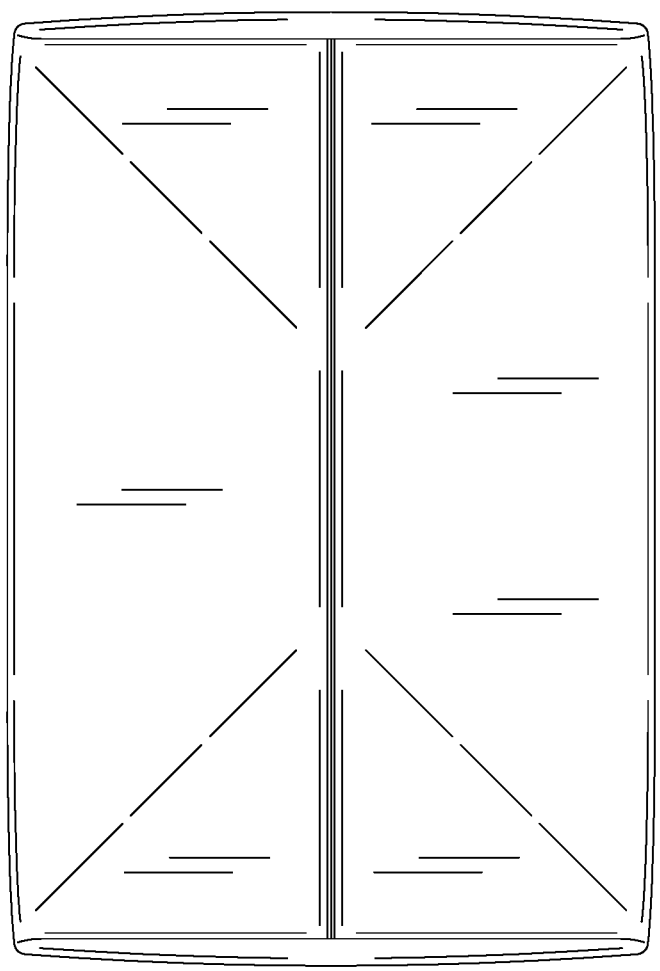
FIG. 27 is an elevational view of a second end of the packaged compressed pine straw mass.

FIG. 20 depicts a block diagram of a pine straw processing system 5 according to some embodiments of the present disclosure. In addition to the components of the system 5 described above with regard to FIGS. 1-19, which essentially have the same functionality in the embodiment of FIG. 20, the system 5 includes an air separator 502, paint booth 504 and dryer 506, any or all of which may be controlled by controller 30. Pine straw may be conveyed by an incline conveyor (not specifically shown), and instead of falling from the end of the incline conveyor (not specifically shown) into the bagger 20, the straw falls off the end of the incline conveyor (not specifically shown). The air separator 502 can include a fan configured to blow air at a suitable flow rate to push pine straw into a hopper as the pine straw falls from the incline conveyor (not specifically shown) and in front of the air separator 502. Heavier objects (e.g., debris) continue to fall, and are not blown into the hopper with the pine straw.

After the pine straw is pushed into the hopper by the air separator 502, the pine straw may be provided to a paint booth that sprays paint on the pine straw. Various types of paint may be used to paint the pine straw. After the pine straw has been painted, it may be provided to a dryer, where the paint may be allowed to dry. Once the paint has dried, the pine straw may be provided to incline conveyor 112 and then to the bagger 20, where the pine straw may be compressed and bagged as described herein.

Figure 28:
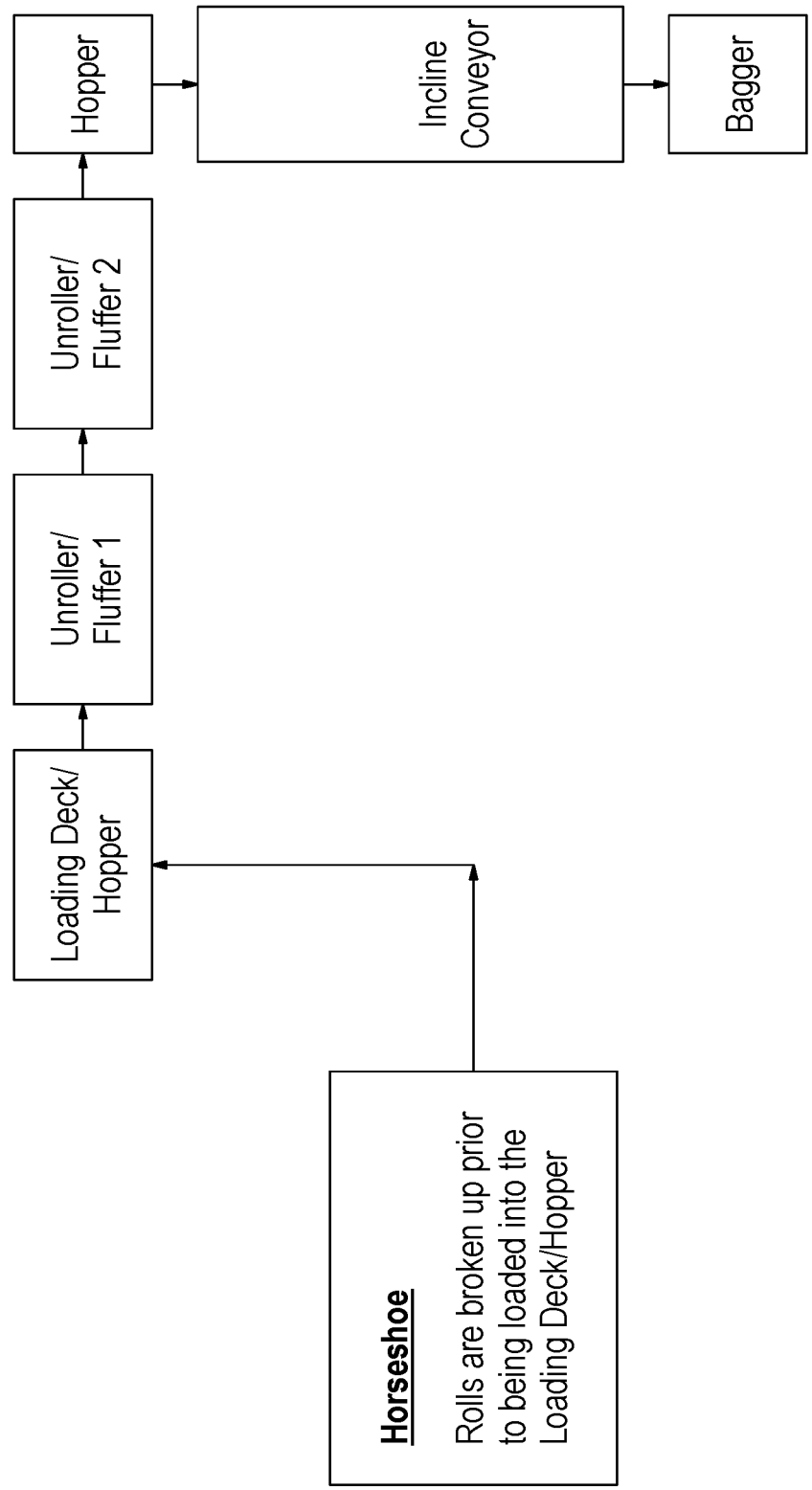
FIG. 28 is a schematic illustrating the conveyor system process of the present invention.
Figure 29:
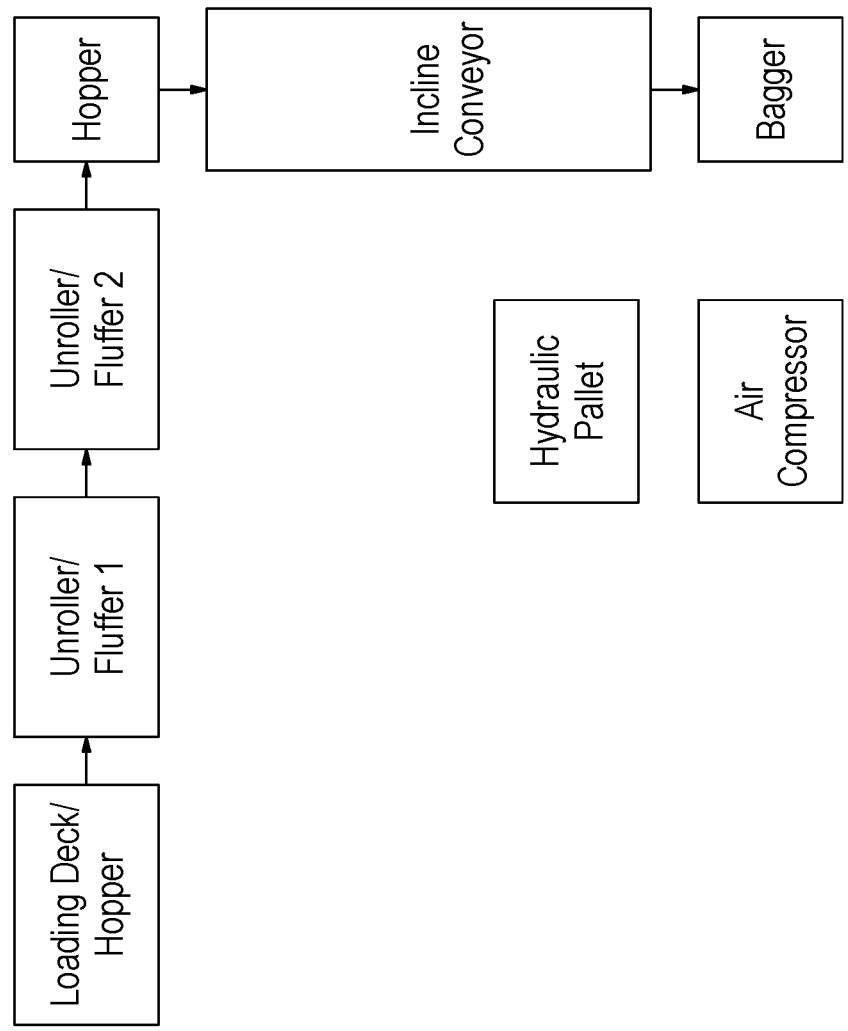
FIG. 29 is another schematic illustrating the conveyor system process of the present invention.

Additional description of and figures showing the system 5 in accordance with some embodiments of the present disclosure are depicted in FIGS. 28 and 29.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

We claim:

1. A method of packaging pine straw comprising:
providing an electronically-controlled system configured for packaging pine straw, the system including a conveyor assembly, a bagger and a system logic that controls conveying, fluffing, weighing, compressing and packaging of the pine straw,
providing a mass of pine straw including debris,
using the conveyer assembly to convey the mass of pine straw to a pre-weigh area of the bagger at a first conveyer rate,
determining that the mass of pine straw in the pre-weigh area exceeds a first weight threshold,
responsive to determining that the first weight threshold has been exceeded, causing the system logic to slow the conveyer assembly from the first conveyer rate to a second conveyer rate, determining that the mass of pine straw in the pre-weigh area exceeds a second weight threshold, responsive to determining that the second weight threshold has been exceeded, using the system to compress the mass of pine straw and enclose the mass of pine straw within a flexible plastic sheet thereby forming a packaged mass of compressed pine straw.

2. The method of claim 1 wherein the packaged mass of compressed pine straw weighs from 18 pounds to 25 pounds.

3. The method of claim 1 wherein the mass of pine straw is compressed using between 1750 psi to 2000 psi of pressure.

4. The method of claim 1, further comprising fluffing a first layer of the mass of pine straw with the conveyor assembly without fluffing a second layer of the mass of pine straw.

5. The method of claim 4 including removing pine straw dust from the bagger using an aspiration system.

6. A packaged mass of compressed pine straw manufactured using the method of claim 1.

7. A pine straw packaging system comprising:

a system logic configured for controlling two or more processes selected from the group consisting of conveying pine straw, fluffing pine straw, weighing pine straw, compressing pine straw and packaging pine straw, a pine straw conveyor operatively coupled to the system logic, the pine straw conveyor configured to:

receive instructions from the system logic to transition between a first conveyer rate and a second conveyer rate that is slower than the first conveyer rate responsive to the system logic determining that the pine straw within a pre-weigh area of a pine straw bagger exceeds a predetermined weight threshold, convey, fluff, and facilitate removal of debris from pine straw, and the pine straw bagger operatively coupled to the system logic, the pine straw bagger comprising the pre-weigh area, the pine straw bagger configured for removing additional debris from pine straw and compressing and packaging pine straw.

8. The system of claim 7 wherein the pine straw conveyor is configured for facilitating removal of debris selected from the group consisting of limbs, pine cones and combination thereof.

9. The system of claim 8 wherein the pine straw bagger is configured for removing additional debris selected from the group consisting of dust, rocks, broken pine straw pieces and combinations thereof.

10. The system of claim 7 wherein the system logic is configured for controlling three or more of the processes.

11. The system of claim 7 wherein the system logic is configured for controlling four or more of the processes.

12. The system of claim 7 wherein the system logic is configured for controlling five of the processes.

13. The system of claim 7 including an aspiration system operatively coupled to the system logic and configured for removing dust from pine straw.

14. A method of packaging pine straw comprising using the system of claim 12 to convey a mass of pine straw, fluff the mass of pine straw, weigh the mass of pine straw, compress the mass of pine straw, and package the mass of pine straw, wherein conveying the mass of pine straw comprises reducing a conveyer rate from a first conveyer rate to a second conveyer rate responsive to the system determining that the mass of pine straw in the pine straw bagger exceeds a predetermined weight threshold.

15. A mass of compressed pine straw manufactured using the system of claim 7.

16. A packaged mass of compressed pine straw manufactured using the system of claim 7.

17. A packaged, substantially rectangular mass of pine straw manufactured using the system of claim 7.

18. A system for packaging straw comprising:

a system logic that controls at least four processes, the at least four processes being selected from the group consisting of conveying straw, fluffing straw, cleaning straw, weighing straw, compressing straw and packaging straw, and an apparatus operatively coupled to and controlled by the system logic, the apparatus being configured for performing at least four of the processes, wherein the apparatus comprises a bagger and a conveyer configured to transition between a first conveyer rate and a second conveyer rate that is slower than the first conveyer rate responsive to the system logic determining that the straw within the bagger exceeds a predetermined weight threshold, wherein the apparatus comprises a fluffer arranged above the conveyer, the fluffer being configured for fluffing an upper layer of straw conveyed by the conveyor without fluffing a lower layer of straw conveyed by the conveyor.

19. A compressed mass of pine straw manufactured using the system of claim 18.

\* \* \* \* \*